US011056097B2

(12) United States Patent
Short et al.

(10) Patent No.: US 11,056,097 B2
(45) Date of Patent: Jul. 6, 2021

(54) METHOD AND SYSTEM FOR GENERATING ADVANCED FEATURE DISCRIMINATION VECTORS FOR USE IN SPEECH RECOGNITION

(71) Applicant: XMOS INC., Hampton, NH (US)

(72) Inventors: Kevin M. Short, Durham, NH (US); Brian Hone, Ipswich, MA (US)

(73) Assignee: XMOS INC., Hampton, NH (US)

( * ) Notice: Subject to any disclaimer, the term of this patent is extended or adjusted under 35 U.S.C. 154(b) by 72 days.

(21) Appl. No.: 16/520,104

(22) Filed: Jul. 23, 2019

(65) Prior Publication Data

US 2020/0160839 A1    May 21, 2020

Related U.S. Application Data

(63) Continuation of application No. 15/638,627, filed on Jun. 30, 2017, now Pat. No. 10,410,623, which is a
(Continued)

(51) Int. Cl.
*G10L 15/02* (2006.01)
*G10L 25/21* (2013.01)
(Continued)

(52) U.S. Cl.
CPC .............. *G10L 15/02* (2013.01); *G10L 25/03* (2013.01); *G10L 25/18* (2013.01); *G10L 25/21* (2013.01);
(Continued)

(58) Field of Classification Search
CPC ........................................................ G10L 15/02
See application file for complete search history.

(56) References Cited

U.S. PATENT DOCUMENTS 4,559,605 A    12/1985  Norsworthy
5,842,162 A    11/1998  Fineberg et al.
(Continued)

FOREIGN PATENT DOCUMENTS

EP     1926321 A1    5/2008
JP     2002168950 A  6/2002
(Continued)

OTHER PUBLICATIONS 13784390.0, "European Application Serial No. 13784390.0, Extended European Search Report dated Mar. 16, 2016", Kaonyx Labs LLC, 9 Pages.
(Continued)

*Primary Examiner* — Douglas Godbold
(74) *Attorney, Agent, or Firm* — GTC Law Group PC & Affiliates

(57) ABSTRACT

A computer-implemented method of generating advanced feature discrimination vectors (AFDVs) representing sounds forming part of an audio signal input to a device is provided. The method includes taking a plurality of samples of the audio signal, and for each sample of the audio signal taken: performing a signal analysis on the sample to extract one or more high resolution oscillator peaks therefrom; renormalizing the extracted oscillator peaks to eliminate variations in the fundamental frequency and time duration for each sample occurring over the window; normalizing the power of the renormalized extracted oscillator peaks; and forming the renormalized and power normalized extracted oscillator peaks into a respective AFDV for the sample. The method further includes outputting the respective AFDV to a comparison function configured to identify a characteristic of the sample based on a comparison of the respective AFDV with a library of AFDVs associated with known sounds and/or known speakers.

25 Claims, 13 Drawing Sheets

Related U.S. Application Data continuation of application No. 14/217,198, filed on Mar. 17, 2014, now Pat. No. 9,728,182.

(60) Provisional application No. 61/914,002, filed on Dec. 10, 2013, provisional application No. 61/786,888, filed on Mar. 15, 2013.

(51) Int. Cl.
  *G10L 25/18* (2013.01)
  *G10L 25/24* (2013.01)
  *G10L 25/03* (2013.01)
  *G10L 25/93* (2013.01)

(52) U.S. Cl.
  CPC .............. *G10L 25/24* (2013.01); *G10L 25/93* (2013.01); *G10L 2015/025* (2013.01)

(56) References Cited

U.S. PATENT DOCUMENTS

| | | | |
|---|---|---|---|
| 6,233,550 B1* | 5/2001 | Gersho | G10L 19/10 704/208 |
| 6,253,175 B1 | 6/2001 | Basu et al. | |
| 6,381,571 B1 | 4/2002 | Gong et al. | |
| 6,526,378 B1 | 2/2003 | Tasaki et al. | |
| 6,535,666 B1 | 3/2003 | Dogan et al. | |
| 7,454,333 B2 | 11/2008 | Ramakrishnan et al. | |
| 7,457,756 B1 | 11/2008 | Nelson et al. | |
| 7,729,912 B1 | 6/2010 | Bacchiani et al. | |
| 8,638,952 B2 | 1/2014 | Matsuo et al. | |
| 8,694,306 B1 | 4/2014 | Short et al. | |
| 9,443,535 B2 | 9/2016 | Short et al. | |
| 9,495,975 B2 | 11/2016 | Short et al. | |
| 9,728,182 B2* | 8/2017 | Short | G10L 25/03 |
| 10,410,623 B2* | 9/2019 | Short | G10L 25/21 |
| 10,497,381 B2 | 12/2019 | Short et al. | |
| 2004/0230428 A1 | 11/2004 | Choi et al. | |
| 2005/0091042 A1 | 4/2005 | Acero et al. | |
| 2005/0156780 A1 | 7/2005 | Bonthron et al. | |
| 2005/0212930 A1 | 9/2005 | Sim et al. | |
| 2006/0053002 A1 | 3/2006 | Visser et al. | |
| 2006/0056647 A1 | 3/2006 | Ramakrishnan et al. | |
| 2006/0153059 A1 | 7/2006 | Spence et al. | |
| 2006/0269057 A1* | 11/2006 | Short | G10L 25/90 380/228 |
| 2008/0228470 A1 | 9/2008 | Hiroe et al. | |
| 2009/0222259 A1* | 9/2009 | Kida | G10L 15/02 704/207 |
| 2010/0142715 A1* | 6/2010 | Goldstein | G11B 20/10527 381/56 |
| 2010/0302971 A1 | 12/2010 | Walker et al. | |
| 2010/0322437 A1 | 12/2010 | Matsuo et al. | |
| 2011/0035215 A1* | 2/2011 | Sompolinsky | G10L 15/02 704/231 |
| 2011/0218952 A1* | 9/2011 | Mitchell | G10L 17/26 706/12 |
| 2012/0226691 A1 | 9/2012 | Edwards | |
| 2012/0232899 A1* | 9/2012 | Koval | G10L 17/14 704/239 |
| 2013/0225128 A1* | 8/2013 | Gomar | H04W 12/06 455/411 |
| 2014/0079248 A1 | 3/2014 | Short et al. | |
| 2014/0163991 A1 | 6/2014 | Short et al. | |
| 2014/0316771 A1 | 10/2014 | Short et al. | |
| 2015/0106095 A1* | 4/2015 | Mitchell | G08B 13/16 704/236 |
| 2015/0287422 A1 | 10/2015 | Short | |
| 2015/0348536 A1* | 12/2015 | Ando | G10L 15/01 704/234 |
| 2016/0071528 A9 | 3/2016 | Short et al. | |
| 2016/0284343 A1 | 9/2016 | Short et al. | |
| 2017/0004844 A1 | 1/2017 | Short et al. | |
| 2017/0301343 A1 | 10/2017 | Short et al. | |
| 2020/0058316 A1 | 2/2020 | Short et al. | |

FOREIGN PATENT DOCUMENTS

| | | | |
|---|---|---|---|
| JP | 2005229453 | A | 8/2005 |
| JP | 2009089315 | A | 4/2009 |
| JP | 2009533912 | A | 9/2009 |
| JP | 2011007861 | A | 1/2011 |
| KR | 101001839 | B1 | 12/2010 |
| RU | 2216052 | C2 | 11/2003 |
| WO | 2003041052 | A1 | 5/2003 |
| WO | 2005029467 | A1 | 3/2005 |
| WO | 2007118583 | A1 | 10/2007 |
| WO | 2013166439 | A1 | 11/2013 |
| WO | 2014145960 | A2 | 9/2014 |
| WO | 2014145960 | A3 | 3/2015 |
| WO | 2015157458 | A1 | 10/2015 |

OTHER PUBLICATIONS 14763371.3, "European Application Serial No. 14763371.3, Extended European Search Report dated Jul. 27, 2017", Setem Technologies, Inc., 9 Pages.

Dognin, Pierrre L., "A Bandpass Transform for Speaker Normalization", Ph.D. Dissertation, University of Pittsbugh 2003, Dissertation Abstracts International Section B: The Sciences and Engineering, URL:http://d-scholarship.pitt.edu/8926/1/Dissertation_Pierre_L_Dognin 23July200.pdf [retrieved on Mar. 6, 2017], 2004, 94 pages.

Duong, Ngoc Q. et al., "Under-Determined Reverberant Audio Source Separation Using a Full-Rank Spatial Covariance Model", IEEE Transactions on Audio, Speech and Language Processing. IEEE Service Center, New York, NY. USA. vol. 18, No. 7, Sep. 1, 2010, Sep. 1, 2010, pp. 1830-1840.

Fujimoto, K. et al., "Estimation and tracking of fundamental, 2nd and 3d harmonic frequencies for spectrogram normalization in speech recognition", Bulletin of the Polish Academy of Sciences. Technical Sciences, vol. 60, No. 1, 2012, pp. 71-81.

Glavitsch, Ulrike, "Speaker normalization with respect to F0, a perceptual approach", Eidgenossische Technische Hochschule Zurich Swiss Federal Institute of Technology Zurich, TIK-Report Nr, 185 URL:http://www.tik.ee.ethz.ch/spr/publications/Glavitsch:03_report. pdf [retrieved on Jun. 23, 2017], Dec. 22, 2003, 12 pages.

Nelson, Douglas J., "Applications of Surface Correlation to the Estimation of the Harmonic Fundamental of Speech", EURASIP Journal on Applied Signal Processing, 2002, pp. 1, 80-86.

Nelson, Douglas J., "Cross-spectral methods for processing speech", J. Acoust. Soc. Am., vol. 110, No. 5, Pt. 1, Nov. 2001, pp. 2575-2592.

PCT/US2013/039544, "International Application Serial No. PCT/US2013/039544, International Preliminary Report on Patentability With Written Opinion dated Nov. 13, 2014", Kaonyx Labs LLC, 7 Pages.

PCT/US2013/039544, "International Application Serial No. PCT/US2013/039544, International Search Report and Written Opinion dated Sep. 27, 2013", 10 pages.

PCT/US2014/030819, "International Application Serial No. PCT/US2014/030819, International Preliminary Report on Patentability and Written Opinion dated Sep. 15, 2015", Setem Technologies, Inc., 4 Pages.

PCT/US2014/030819, "International Application Serial No. PCT/US2014/030819, International Search Report and Written Opinion dated Jan. 15, 2015", Setem Technologies, Inc., 5 Pages.

PCT/US2015/024988, "International Application Serial No. PCT/US2015/024988, International Search Report dated Jun. 30, 2015", Kaonyx Labs, LLC, 9 pages.

PCT/US2015/024988, "International Application Serial No. PCT/US2015/024988, International Preliminary Report on Patentability and Written Opinion dated Oct. 20, 2016", Setem Technologies, Inc., 6 Pages.

Short, Kevin M. et al., "Multichannel Audio Processing Using a Unified-Domain Representation", J. Audio Eng. Soc., vol. 55, No. 3, Mar. 2007 (Mar. 1, 2007), pp. 156-165.

Short, Kevin M. et al., "Signal Analysis Using the Complex Spectral Phase Evolution (CSPE) Method", Audio Engineering Society,

(56) References Cited

OTHER PUBLICATIONS

Convention Paper 6645, Presented at the 120th Convention, Paris, France URL: http://jssunderlin.pbworks.com/f/13449.pdf, http://www.ragomusic.com/publications/AES120_koz_CSPE.pdf, May 20-23, 2006, 13 pages.
Virtanen, Tuomas et al., "Separation of Harmonic Sound Sources Using Sinusoidal Modeling", 2013 IEEE International Conference on Acoustics, Speech and Signal Processing (ICASSP); Vancoucer, BC; May 26-31, 2013, vol. 2., Jun. 5, 2000 (Jun. 5, 2000), pp. 765-768.

\* cited by examiner

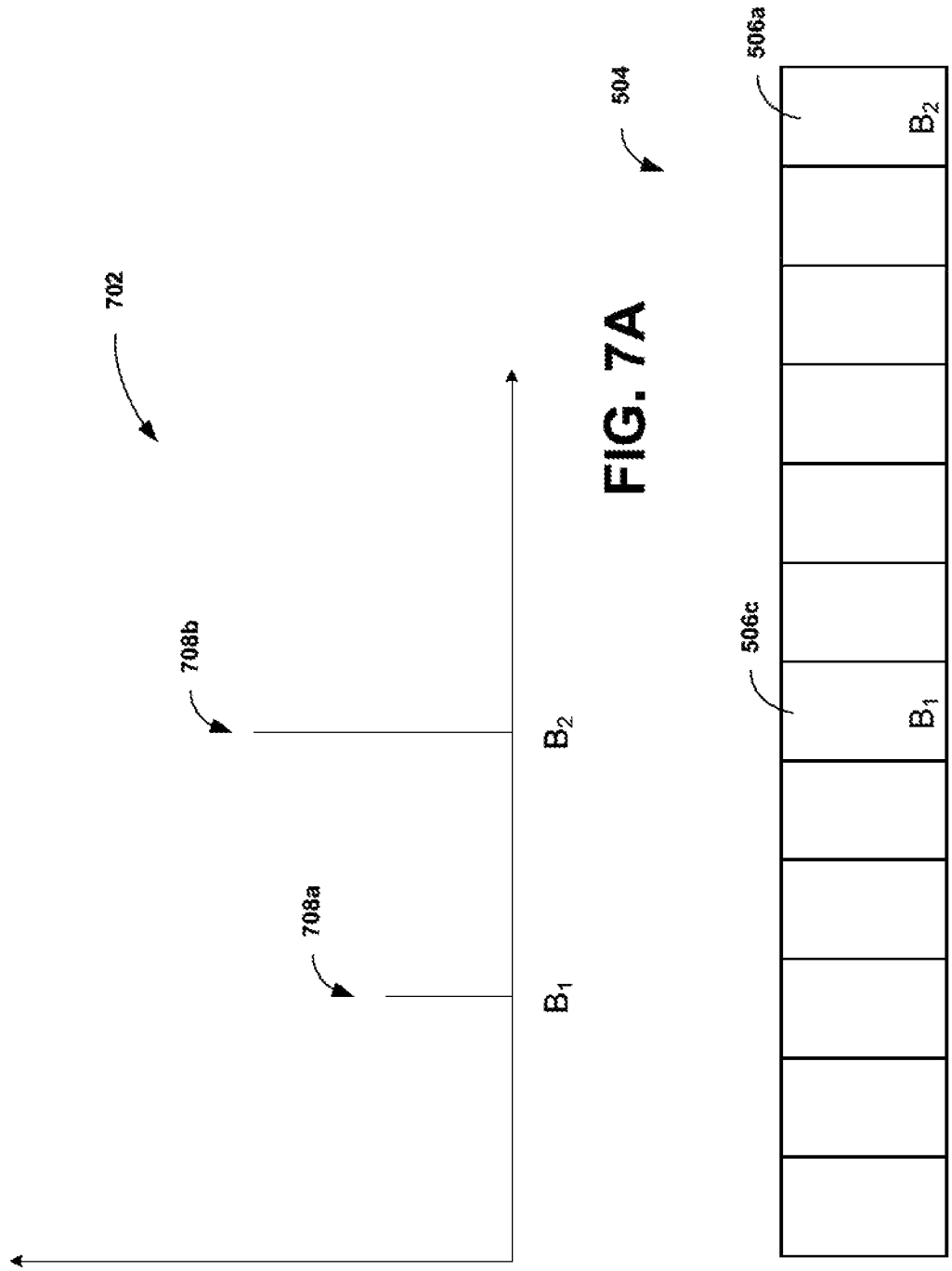

METHOD AND SYSTEM FOR GENERATING ADVANCED FEATURE DISCRIMINATION VECTORS FOR USE IN SPEECH RECOGNITION

CROSS-REFERENCE TO RELATED APPLICATIONS

This application is a continuation of U.S. application Ser. No. 15/638,627, filed Jun. 30, 2017.

U.S. application Ser. No. 15/638,627 is a continuation of U.S. application Ser. No. 14/217,198, filed Mar. 17, 2014, now U.S. Pat. No. 9,728,182.

U.S. application Ser. No. 14/217,198 claims the benefit of priority from U.S. Provisional Application Ser. No. 61/786,888, filed Mar. 15, 2013, and entitled "Methods and Systems for Advanced Feature Discrimination Vectors," which is incorporated herein in its entirety by this reference.

U.S. application Ser. No. 14/217,198 further claims priority from U.S. Provisional Application Ser. No. 61/914,002, filed Dec. 10, 2013 and entitled "Systems & Method for Automated Speech Recognition Using Grouping of Advanced Feature Discrimination Vectors," which is incorporated herein in its entirety by this reference.

FIELD OF THE INVENTION

This application relates generally to speech recognition systems, and more particularly to generating feature vectors for application in speech recognition that are less susceptible to the variations in speech characteristics between individual speakers.

BACKGROUND OF THE INVENTION

Speech recognition can be generally defined as the ability of a computer or machine to identify and respond to the sounds produced in human speech. Speech recognition processes are often referred to generally as "automatic speech recognition" ("ASR"), "computer speech recognition", and/or "speech to text." Voice recognition is a related process that generally refers to finding the identity of the person who is speaking, in contrast to determining what the speaker is saying.

Speech recognition systems can be broadly categorized as isolated-word recognition systems and continuous speech recognition systems. Isolated-word recognition systems handle speech with short pauses between spoken words, typically involve a restricted vocabulary that they must recognize, and are often employed in command/control type applications. Continuous speech recognition systems involve the recognition and transcription of naturally spoken speech (often performed in real time), and thus require a more universal vocabulary and the ability to discriminate words that can often run together when spoken naturally with the words that are spoken immediately before and after.

Examples of isolated-word recognition systems include machines deployed in call centers that initiate and receive calls and navigate humans through menu options to avoid or minimize human interaction. Cell phones employ such systems to perform functions such as name-dialing, answering calls, Internet navigation, and other simple menu options. Voice-control of menu options also finds application in, for example, computers, televisions and vehicles. Continuous speech recognition systems are typically employed in applications such as voice to text, speaker recognition and natural language translation.

A typical speech recognition system consists of: a) a front-end section for extracting a set of spectral-temporal speech features from a temporal sample of the time-domain speech signal from which speech is to be recognized; b) an intermediate section that consists of statistical acoustic speech models that represent a distribution of the speech features that occur for each of a set of speech sounds when uttered. These speech sounds are referred to as phonemes, which can be defined as the smallest unit of speech that can be used to make one word different than another. Such models can also be used to represent sub-phonemes; and c) a speech decoder that uses various language rules and word models by which to determine from the combination of detected sub-phonemes and phonemes what words are being spoken. Often the prediction can be enhanced by considering the typical order in which various words are used in the language in which the speech is uttered. The intermediate and decoder sections are often lumped together and referred to as a speech recognition engine.

While there have been many advances in ASR in recent years, accurate generalized speech recognition remains a very difficult problem to solve. Enabling a computer to do what we as humans take for granted is no easy task. The most basic task in any automatic speech recognition system is to use extracted features to predict which phoneme (or sub-phoneme) is most likely being uttered during each temporal sample (typically referred to as a window or frame of data) based on the features captured for that window. The models against which these features are compared are "pre-trained" statistical models of the distributions of speech features typically found when sounds are uttered. The reason that these models are "pre-trained" is that they must take into account the vast statistical variation of the features that are extracted for any given speaker. Put another way, no person says the same thing in the exact same way, and thus the features extracted for each speaker of the exact same thing vary commensurately.

Thus, the most basic task in speech recognition is also the arguably the most difficult one. There are a large number of variables that contribute to the variations in speech from one speaker to another. They include for example, the time duration of the spoken word. Not only does this vary from person to person, it even varies for the same person each time the same word is spoken. To make things more complicated, the variation in the duration of a word is not even uniform over the various sounds (i.e. phonemes and sub-phonemes) that form the word.

Another form of speaker variability lies in the fact that the content of one's speech is highly dependent upon a person's anatomical proportions and functionality. As is well known in the art, there are numerous resonances in the human body that contribute to the human voice, and these resonances are directly related to the speaker's anatomy. Gender is a very obvious manifestation of these factors, as the fundamental frequency of speech uttered by men is typically much lower overall when compared to the fundamental frequency of speech uttered by women. In addition, the emotional state and overall health of a speaker will also cause variations on top of the anatomical ones.

Speakers also develop accents, which can have a major effect on speech characteristics and on speech recognition performance. These accents range from national to regional accents and can include very different pronunciations of certain words. Because of the mobility of the general population, these accents are often melded together.

Further complicating the task, particularly with regard to continuous speech recognition, is that the characteristic of a phoneme or sub-phoneme can be greatly affected by the acoustic and phonetic context of those phonemes or sub-phonemes preceding or succeeding it. A similar issue, called co-articulation, refers generally to a situation in which a conceptually isolated speech sound is influenced by, and becomes more like, a preceding or following speech sound.

There are numerous techniques by which known speech recognitions systems deal with these problems in speech variability. As previously discussed, one way is to limit the vocabulary that the system is required to understand (which limits the number of models and permits them to be more specialized), as well as to simplify the speech into single words or very short phrases to minimize issues such as context and co-articulation.

Another technique is to use individualized training, where the statistical distribution of the models are tailored (through a learning process) to a particular user's voice characteristics to aid in recognizing what that person is saying. Such systems are referred to as speaker dependent systems. Of course, it is far more desirable to render systems that are speaker independent, which require more generalized statistical models of speech that do not depend or otherwise employ individualized training for a particular speaker (referred to as "speaker independent" systems). Many developers of such speaker independent systems gather vast amounts of speech from as many speakers as possible to create a massive corpus with the goal of creating models that are intended to statistically represent distributions of these many variables over virtually entire populations for all possible sounds. One of the downsides of this approach is clearly the vast amount of data that must be gathered and maintained. Another is the question of whether such models that have become so generalized as to represent every speaker in a given population can lose their ability to even distinguish speech.

A general methodology commonly employed by known speech recognition systems as discussed above can be illustrated by the simple and high-level representation of a known speech recognition system 100 as is illustrated in FIG. 1. Speech is captured with a transducer (e.g. a microphone) at block 104 in the form of a time domain analog audio signal 101, and is partitioned for analysis using a continuous series of overlapping windows of short time duration (e.g. they are each advanced in time by less than the duration of each window). The portion of the audio signal 101 falling within each window is sampled using an analog to digital converter (ADC) that samples the analog signal at a predetermined sampling rate over each window, and therefore converts the analog time domain signal into a digital time domain audio signal.

At 106, the digital audio signal is then converted, on a frame by frame basis, into a frequency domain representation of the portion of the time domain signal that falls within each window using any of a number of transforms such as the Fast Fourier Transform (FFT), the Discrete Fourier Transform (DFT) the Discrete Cosine Transform (DCT) or possibly other related transforms. The use of one or more of these transforms serves to represent and permit identification of the spectral constituents of the speech signal. As discussed above, these features can provide clues as to what sounds are being uttered over the course of each frame.

These features, as extracted from each window, are then typically formed into a frame of data referred to as a feature vector, and the feature vectors can be stored at 108. The foregoing process is often referred to as the front-end 102 of system 100, and the features extracted thereby can then form the input to a speech recognition engine 110. Speech recognition engine 110 can compare the feature vectors on a frame by frame basis to the statistical models that represent the typical distribution of such features for phonemes and sub-phonemes. Because of an overlap in the statistical distributions of the models, this comparison process typically leads to a statistical prediction of the likelihood that the feature vectors represent the spectral constituents of any one or more of the phonemes or sub-phonemes. Thus, there may be a number of possible matches for each feature vector, and each of those possible matches can be ranked using a probability score.

Ultimately, the probabilities and perhaps even groupings of the extracted feature vectors are fed to a back-end portion of the speech recognition engine 110 of the speech recognition system 100, where they are further processed to predict through statistical probabilities what words and phrases are being uttered over the course of several consecutive overlapping windows. From there, the engine 110 outputs its best guess of what the speech is, and that output 112 can be used for any purpose that suits the application. For example, the output 112 can be transcribed text, or control outputs based on recognized menu commands as discussed above.

One of the most commonly used forms of feature data extracted from speech at the front end of the speech recognition process are known as cepstral coefficients. Cepstral coefficients are derived from an inverse discrete Fourier transform (IDFT) of the logarithm of the short-term power spectrum of a speech segment defined by a window. Put another way cepstral coefficients encode the shape of the log-spectrum of the signal segment. A widely used form of cepstral coefficients is the Mel Frequency Cepstral Coefficients (MFCC). To obtain MFCC features, the spectral magnitude of FFT frequency bins are averaged within frequency bands spaced according to the Mel scale, which is based on a model of human auditory perception. The scale is approximately linear up to about 1000 Hz and approximates the sensitivity of the human ear.

Because cepstral coefficients are primarily concerned with capturing and encoding the power distribution of the speech signal over a range of frequencies, statistical models must be used to account for the variability between speakers who are uttering the same sounds (e.g. words, phonemes, phrases or utterances). Put another way, these variations in speaker characteristics make it very difficult to discriminate between speech phonemes uttered by different individuals based on spectral power alone, because those varying characteristics (such as the fundamental frequency of a speaker and the duration of that speakers speech) are not directly reflected in the spectral power. One of the few variables that may be renormalized out (i.e. made constant for all speakers) for the MFCCs is volume of the speech.

Another known type of feature data is in the form of oscillator peaks. Oscillator peaks are derived to represent the presence, for example, of short-term stable sinusoidal components in each frame of the audio signal. Recent innovations regarding the identification and analysis of such oscillator peaks has made them a more practical means by which to encode the spectral constituents of an audio signal of interest. For example, in the publication by Kevin M. Short and Ricardo A. Garcia entitled "Signal Analysis Using the Complex Spectral Phase Evolution (CSPE) Method," AES 120$^{th}$ Convention, Paris France, May 20-23, 2006, a method of attaining super-resolution of the frequencies of such short-stable oscillators is presented by examining the evolution of the phase of the complex signal spectrum over time-shifted windows of the audio signal being analyzed. This publication is incorporated herein in its entirety by this reference.

In the U.S. patent application Ser. No. 13/886,902 entitled "Systems & Methods for Source Signal Separation," several additional improvements are disclosed that further enhance the CSPE method discussed above, leading to even greater resolution of the properties of the oscillator peaks. One of these techniques includes the ability to establish oscillator peaks even when the audio is frequency modulated such that no short-term stabilized oscillators otherwise exist in the signal. Another improvement eliminates smearing of the oscillator peaks that is caused by transient or amplitude modulation effects. The application of these techniques has markedly improved the ability to distinguish and to thereby identify individual sources contributing to a signal being analyzed. The above-noted application is hereby incorporated herein in its entirety by this reference.

The foregoing improvements permit the underlying signal elements to be represented as essentially delta functions with only a few parameters, and these parameters are determined at a super-resolution that is much finer than the transform resolution of a typical and previously known approach to such analysis. Consequently, one can, for example, look at frequencies of the oscillator peaks on a resolution that is on a fractional period basis, whereas the original transform analysis results in only integer period output. This improved resolution allows for the examination of single excitations periods of an audio signal as it would be produced by the vocal tract, and then one can examine how the effects of the vocal tract (or other environmental conditions) will alter the single excitation period over time.

While such highly accurate oscillator peaks can potentially provide effective feature information for applications such as speech recognition, to be used as direct input to a speech recognition engine, the vectors must still be placed in a format that permits effective comparison to speech that has been similarly encoded by which to accurately predict phonemes and sub-phoneme sounds that are present in the speech signal of interest, notwithstanding the wide variation in speaker characteristics.

SUMMARY OF THE INVENTION

The present invention is a method and system for generating advanced feature discrimination vectors (AFDVs) from highly accurate features in the form of oscillator peaks, which can be renormalized in accordance with embodiments of the invention to facilitate a more direct comparison of the spectral structure of a measured speech signal with similarly encoded speech samples that have been correlated to known speech sounds (e.g. phonemes and sub-phonemes, sibilants, fricatives and plosives).

While such highly accurate oscillator peaks can potentially provide effective feature information for applications such as speech recognition when used as direct input to a speech recognition engine, the vectors may be used more effectively by transforming or renormalizing them to a comparison coordinate system that may be consistent for different speakers. When this is done, the renormalized format permits effective comparison of a given speaker's utterances to speech that has been similarly encoded for a known corpus of other speakers, which allows for the accurate prediction of phonemes and sub-phoneme sounds that are present in the speech signal of interest, notwithstanding the wide variation in speaker characteristics.

Various embodiments of the method of the invention are able to eliminate variations in the fundamental frequency of speakers, as well as the speed (i.e. duration) of their speech. This is accomplished by renormalizing the oscillator peaks with respect to fundamental frequency and the duration of the utterance such that the AFDVs of the invention no longer reflect those variations from one speaker to another. Once renormalized in accordance with embodiments of the method of the invention, the AFDVs can be compared without the need for models that must statistically account for wide variations in those variables, thereby rendering the comparison process more direct and increasing the accuracy and robustness of the speech recognition system so employing embodiments of the invention.

Various embodiments of the invention can produce AFDVs of the invention for use in identifying voiced sounds in conjunction with known feature vectors such as MFCCs. Other embodiments can be extended to produce AFDVs for voiced and semi-voiced sounds as well.

BRIEF DESCRIPTION OF THE DRAWINGS

The following description can be better understood in light of Figures, in which:

FIG. 7A illustrates an embodiment of a 2 harmonic spectral structure representing one "glottal pulse" period of the voiced sound from a sampled window of an audio signal, renormalized in accordance with the method of the invention FIG. 7B is an embodiment an n slot comparator stack employed to form an alignment for the spectral structure illustrated in FIG. 7A in accordance with the invention.

DETAILED DESCRIPTION

A method of renormalizing high-resolution oscillator peaks, extracted from windowed samples of an audio signal, is disclosed that is able to generate feature vectors for which variations in both fundamental frequency and time duration of speech are eliminated. This renormalization process enables the feature vectors of the invention, referred to herein as advanced feature discrimination vectors (AFDVs), that may be aligned within a common coordinate space, free of those variations in frequency and time duration that occurs between speakers and even over speech by a single speaker, to facilitate a simple and accurate determination of matches between those AFDVs generated from a sample of the audio signal and AFDVs generated for known speech at the phoneme and sub-phoneme level.

This renormalization method of the invention can be applied to harmonic groupings of oscillator peaks that are characteristic of voiced sounds, as well as to oscillator peaks that are non-harmonically related, characteristic of unvoiced sounds such as sibilants. Finally, the coordinate system for comparing the AFDVs of the invention can be subdivided, in accordance with predetermined zones of frequencies, to handle cases of semi-voiced sounds that register power similar to voiced components as well as unvoiced components. A technique for normalizing power while maintaining the ratio of power between the subdivisions is disclosed, to provide additional information by which to identify the semi-voiced phonemes and sub-phonemes.

It should be understood that the term "renormalization" is used distinguish between the type of normalization that for example, reduces power to a value of one for purposes of scaling magnitude, and the creation of shifted and scaled versions of data in frequency and/or time, where the intention is that these renormalized values allow the comparison of corresponding renormalized values for different datasets from different speakers and different utterances in a way that eliminates the effects of certain gross influences, in this case frequency scale and time scale.

Figure 1:
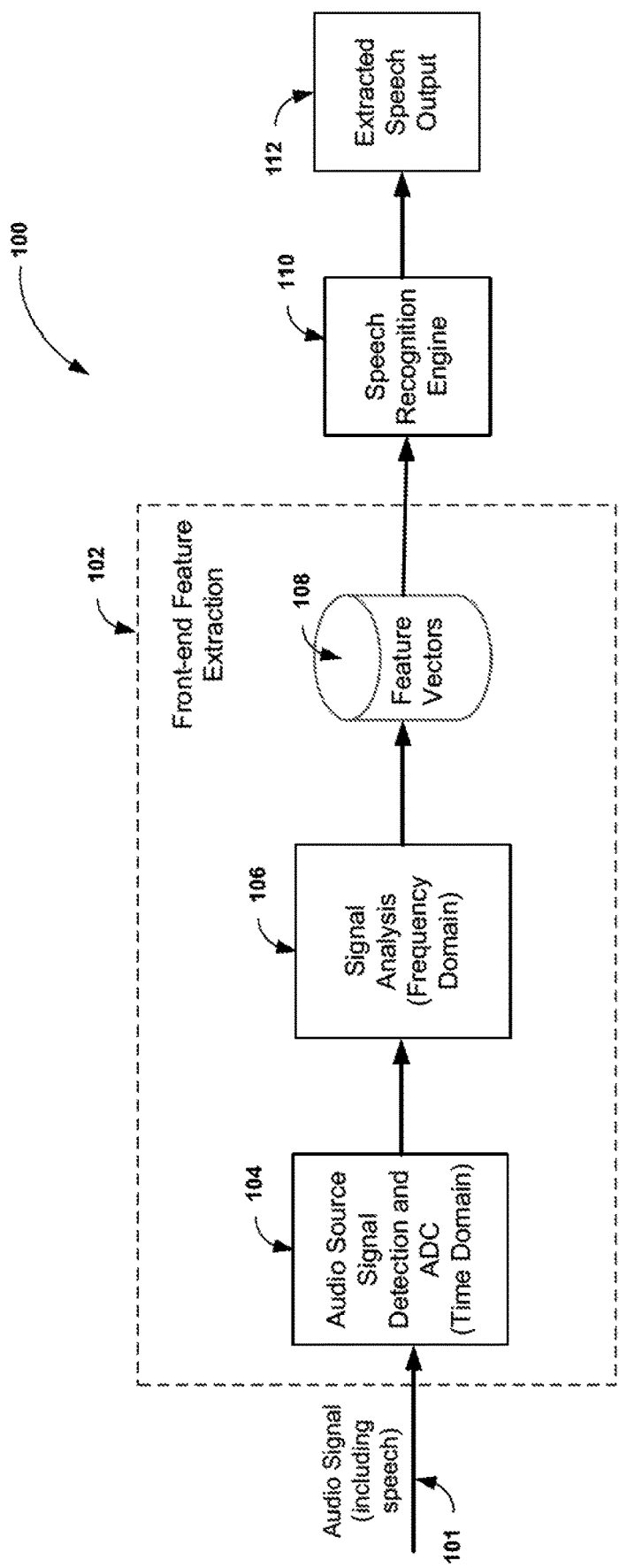
FIG. 1 illustrates a high-level block diagram of a known speech recognition system.
Figure 2:
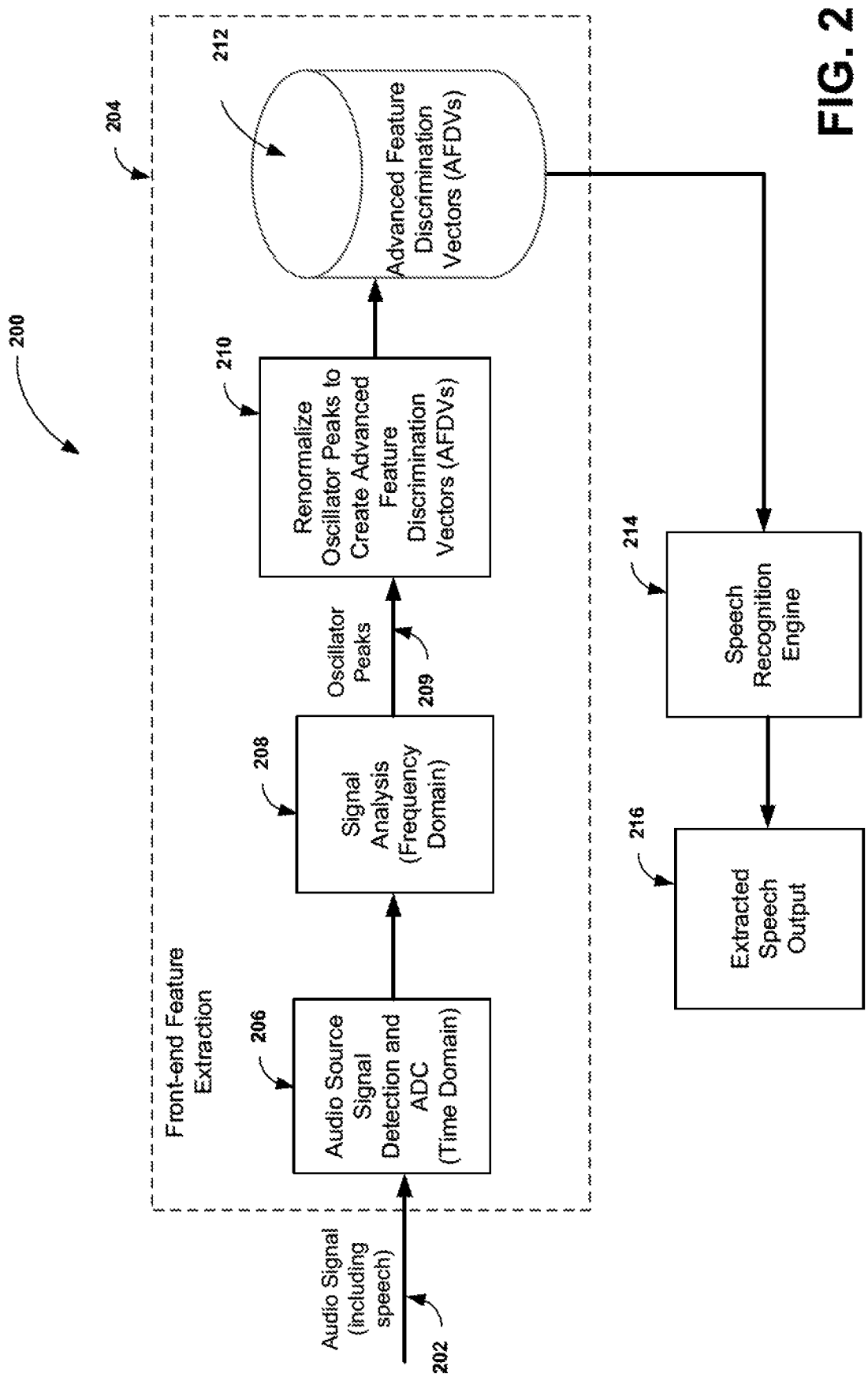
FIG. 2 illustrates a high-level block diagram of a speech recognition system employing an embodiment of the invention.

FIG. 2 illustrates a block diagram of a speech recognition system 200 employing the method and system of the invention. Just as in the case of FIG. 1, a speech recognition system employing the system and method of the invention can employ a front-end section 204 that extracts features from the input audio signal 202, for each of a plurality of short time windows of the signal that overlap each other by some fixed fraction of their period. In an embodiment of the invention, the feature data extracted by the front end 204 from each window of the input audio signal 202 are oscillator peaks 209.

At 206, the detected audio signal 202 is then processed into uniform segments defined by an overlapping time-domain window. Each window is sampled at a predetermined sampling rate and converted to a digital representation of the analog signal by an analog to digital converter (ADC). Those of skill in the art will recognize that the finite number of samples for each "short" window is that number that is appropriate to a given context/application and may include between several tens and several thousands of samples, depending on the desired sample rate. At 206, the digital signal is converted to a frequency domain representation thereof via a transform such as a Fast Fourier Transform (FFT), the Discrete Fourier Transform (DFT), the Discrete Cosine Transform (DCT) or possibly other related transforms.

Those of skill in the art will recognize that the accuracy of frequency estimates produced using the FFT and other like transforms are generally limited by the number of input samples. Conventional FFT and DFT methods have a limited resolution such that the frequency estimate is located in the center of a frequency bin, which introduces error. The CSPE transform disclosed in the above-referenced publication entitled "Signal Analysis Using the Complex Spectral Phase Evolution (CSPE) Method," overcomes these limitations by measuring the complex phase rotation between two time-separated sample windows to detect the actual underlying frequency, thereby enabling a high-resolution estimate of its frequency location within a frequency bin.

Thus, the oscillator peaks can be preferably (but not necessarily) identified with high resolution using the Complex Spectral Phase Evolution (CSPE) methods. Those of skill in the art will appreciate that while the use of the CSPE method is not required for practicing the method and system of the invention for generating Advanced Feature Discrimination Vectors (AFDVs), any manner in which the accuracy of the extracted feature data can be improved will render any AFDVs generated therefrom that much more effective in correctly predicting the speech contained in the audio signal of interest.

The feature data are then renormalized in accordance with the method of the invention as will be described in more detail, and assembled into a frame of vectors for each window, and provided to a speech recognition engine 214 for use in recognizing speech embedded within the acoustic signal. The speech recognition engine is able to use the extracted feature vectors to predict what sounds, words and phrases are uttered and converts those predictions into extracted speech output 216, which can be, as previously described above, in various forms as required by a specific application.

It should be noted that the further improvements to the CSPE method that are disclosed in in U.S. patent application Ser. No. 13/886,902 entitled "Systems & Methods for Source Signal Separation" incorporated by reference above, can also be employed to further improve the frequency estimates of the extracted oscillator peaks. These additions to the CSPE process can improve accuracy even further by eliminating error introduced through the windowing process, by detecting and resolving the parameters governing frequency and amplitude modulation over the window, as well as being able to handle sounds that may exhibit little to no short-term stabilized oscillators.

Additionally, tracking techniques are disclosed in the above-referenced application that can be used when an audio signal contains sounds from multiple sources, to identify the oscillator peaks with each source. When further coupled with the extraction and renormalization method of the invention, speech from one speaker can be isolated from environmental noise and other speakers to make speech recognition of a particular speaker of interest much more robust. Thus, those of skill in the art will further appreciate that while techniques in utilizing the tracking of oscillator peaks to preferentially extract a set of oscillator peaks associated with a given source are not required to practice the present invention in generating AFDVs, they can be invaluable in improving the value of the those AFDVs in applications such as automated speech recognition.

Assuming that the extracted oscillator peaks 209 are suitably accurate in frequency and magnitude, the present method of the invention at 210 is able to renormalize the oscillator peak representations of those short-term stabilized oscillators that are determined to be harmonically related to one another with regard to both frequency and time duration. Put another way, the method of the invention is able to generate feature vectors from harmonically related oscillator peaks extracted from the audio signal for each window, which can be compared to speech of any other speaker in a comparison space that is completely independent of any variations in fundamental frequency and time duration between speakers.

The basis for this renormalization method is now presented with respect to some examples of audio signals processed in accordance with the method of the invention. There are typically three major categories of sounds produced in human speech. These are typically defined as voiced, semi-voiced and unvoiced. Voiced sounds are typically vowel sounds such as when saying the letter E ("ee"). Unvoiced sounds are sometimes referred to as sibilants or turbulent sounds, and correspond to sounds such as the S sound at the end of a word like hiss. Semi-voiced sounds are sounds referred to as fricative or plosives, and tend to have a combination of unvoiced and voiced sounds. An example would result from saying the letter P. It has a combination of the consonant beginning "puh," and the vowel sound like "ee."

Figure 3A:
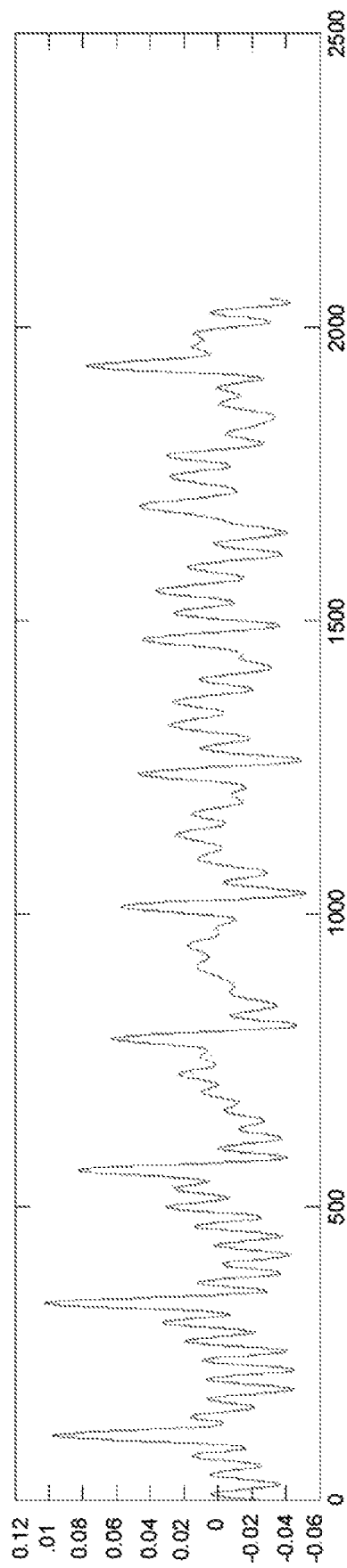
FIGS. 3A and 3B illustrate the periodic nature of the glottal pulse for voiced sounds of human speech.
Figure 3B:
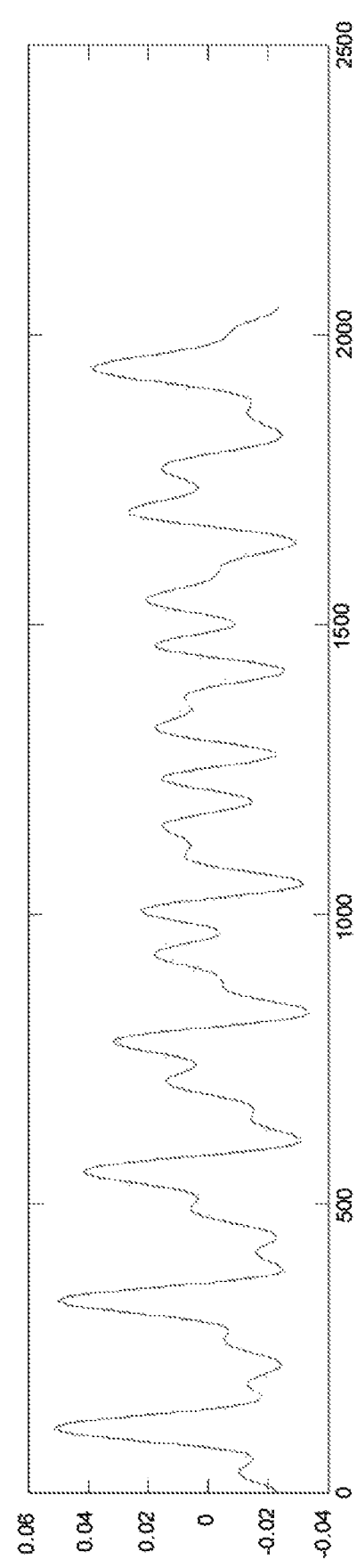

Voiced sounds are produced by a repeating sequence of opening and closing of glottal folds, often referred to as the glottal pulse, and can have a frequency of between about 40 Hz for a low frequency male voice to about 600 Hz for female children's voice. This frequency, referred to as the fundamental frequency of the sound, is therefore obviously speaker dependent, and will further vary depending upon the phoneme being uttered, the linguistic and emotional context in which it is uttered. FIGS. 3A and 3B illustrate the periodic nature of the glottal pulse for voiced sounds of human speech. The spectrum of voiced sounds is shaped by the resonance of the vocal tract filter and contains the harmonics of the quasi-periodic glottal excitation, and has most of its power in the lower frequency bands. By contrast, the spectrum of unvoiced sounds is non-harmonic and usually has more energy in higher frequency bands.

Figure 4A:
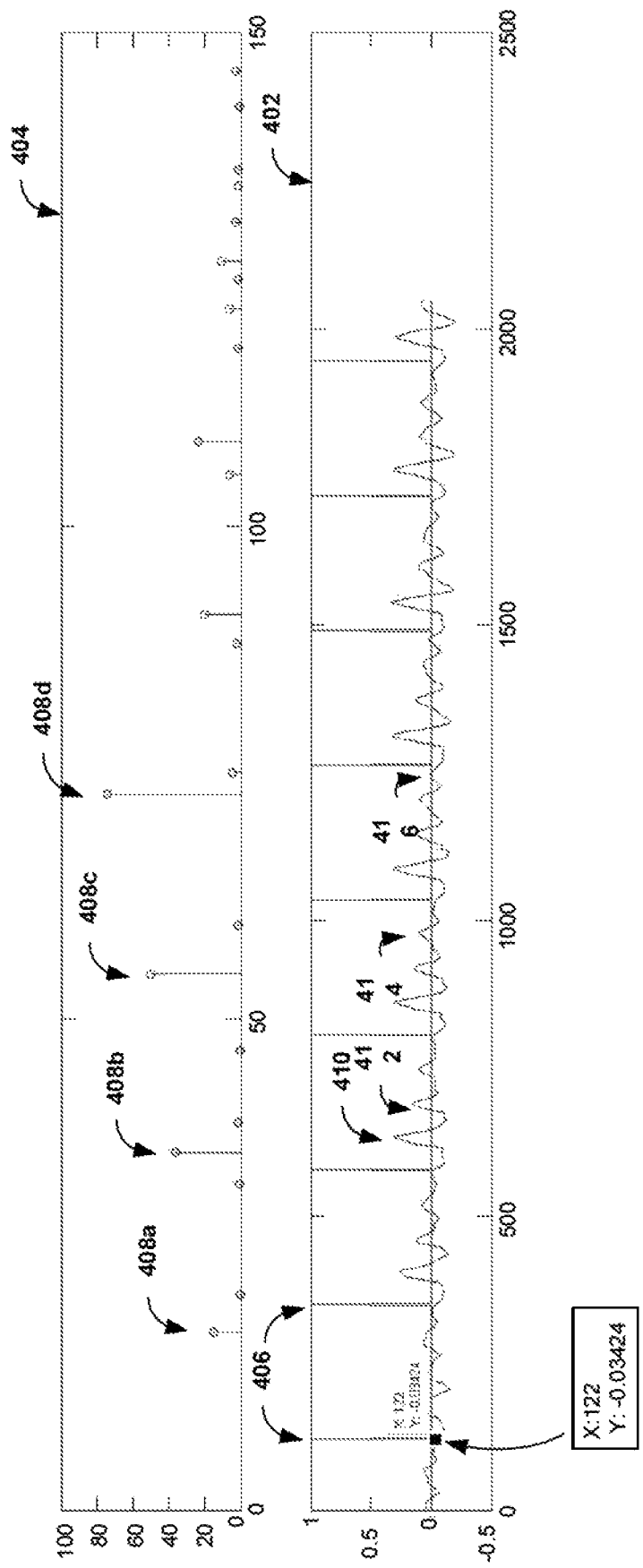
FIG. 4A illustrates one window of an input audio signal in both time and frequency domain.

Referring to FIG. 4A, the lower plot 402 illustrates one window of an audio signal (202, FIG. 2), that demonstrates the periodicity of a voiced speech sound in accordance with the glottal pulse of the person uttering the voiced speech. This utterance exhibits approximately nine periods or repeated cycles 406 over the window. In plot 404, the spectral representation of the window of signal is illustrated as oscillator peaks, as determined by the conversion processes discussed above at block 208 of FIG. 2. It should be noted that the oscillator peaks illustrated herein are those determined by the CSPE-based oscillator method described above. Oscillator peaks derived through other techniques known in the art would tend to be smeared out, as opposed to the well-resolved peaks shown here. This plot illustrates that a first oscillation 408a occurs at a frequency that is directly related to the periodicity of the utterance of the signal over the window. The frequency oscillator peak 408a is essentially at the fundamental frequency $f_0$ of that utterance over the window.

If one examines each period as produced by the glottal pulse, it has a number of local maxima that correspond to the harmonic resonances of the voiced sound. These local maxima will vary in number and magnitude for each type of voiced sound, and are correlated with the type of sound being uttered. With reference to plot 402 of FIG. 4A, one can see that there are four local maxima 410, 412, 414 and 416 in each period. This signal structure is related to the four oscillator peaks 408a, 408b, 408c and 408d respectively of spectral plot 404. Regardless of how $f_0$ evolves over time between adjacent window samples of the signal (202, FIG. 2), the harmonic relationship between these oscillator peaks remains relatively constant for a given sound. This is also true as $f_0$ varies between two speakers. Put another way, for the utterance of a given sound, regardless of in which frequency bin the oscillator peak 408a falls for any given speaker, the number of oscillator peaks and their relative relationship in frequency remains very much the same.

Figure 4B:
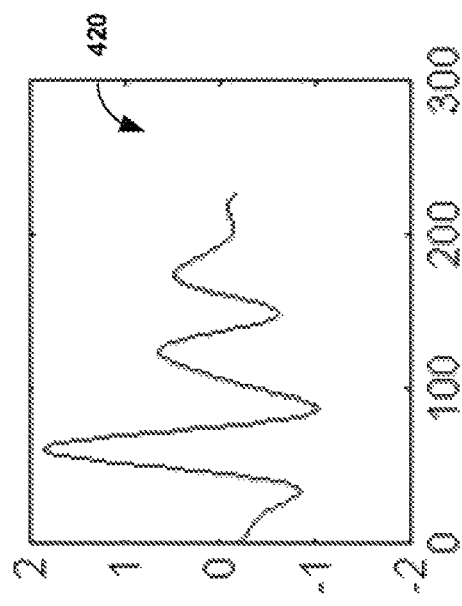
FIG. 4B is a close approximation of a single period of the audio signal of FIG. 4A.
Figure 4C:
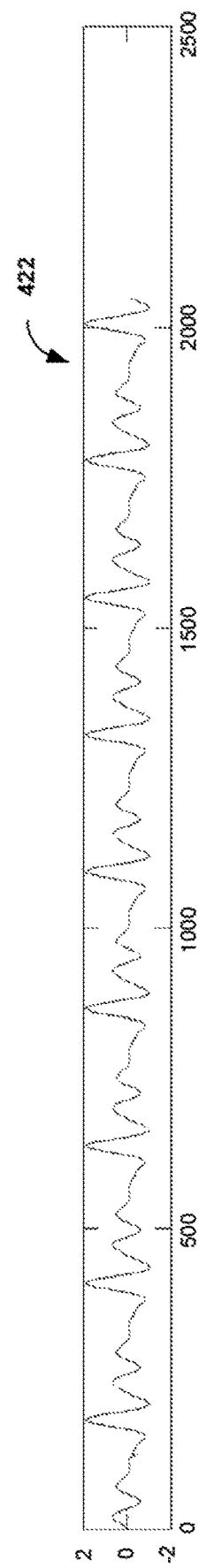
FIG. 4C illustrates a concatenation of the single period of FIG. 4B to produce a close approximation to the full sample of the audio signal of FIG. 4A.

By taking the four oscillator peaks 408a, 408b, 408c and 408d from the frequency bins in which they are located in plot 404, and putting them into directly adjacent frequency bins 1, 2, 3 and 4 of a new spectral plot (not shown), a single period of signal from those oscillator peaks can be produced that is very close to a single period of the original signal of 9 periods of plot 402. This single period is illustrated in FIG. 4B. When nine of the signal periods of FIG. 4B are concatenated together, the signal of FIG. 4C is produced, which fairly closely approximates the window of the original signal of plot 402 of FIG. 4A. One property that results from this ability to rescale time or frequency through the mathematical representation is that with high accuracy, it becomes possible to transform any input signal, e.g., a collection of voice recordings, onto a common frequency scale or time scale so that different speakers can be compared in a common coordinate system. When these different speakers are placed into the same coordinate system—call it the comparison coordinates—the sounds produced by the speakers can be compared to determine a discriminator that indicates when the different speakers are making the same sounds, and by further testing against a database (or training corpus) of known sounds, it is possible to do speech recognition in the new comparison coordinates.

Therefore, it can be seen that by extracting a single period of the signal based on the glottal pulse as previously described, a rescaling of the frequency axis has occurred by placing the oscillator peaks in adjacent bins. Thus, the information regarding the signal has been preserved, but the information provided by the single period has been renormalized with respect to frequency. Put another way, the information is no longer reflecting the fundamental frequency $f_0$ of the speaker, and therefore this information can be compared with that derived from any speaker, regardless of the fundamental frequency of that speaker in uttering the sound. Furthermore, if a particular sound is uttered in such a way that the fundamental frequency $f_0$ varies over the duration of the sound, the renormalization process of the invention will allow for comparison of the features throughout the duration of the sound.

Those of skill in the art will appreciate that this renormalization method of the invention results in the ability to create a common coordinate system by which these oscillator peak features may be compared between all speakers, without the need to consider statistical distributions of spectral power over as many speakers (or even all speakers in the world) as might be represented by an "infinite corpus," to account for the variations in frequency among speakers, or even variations for a given speaker due to emotion and linguistic context.

Those of skill in the art will further appreciate that the above-described renormalization method of the invention also serves to renormalize time duration variance in the speech signal over the sample window as well. Because some people speak very fast, and others might speak very slowly (such as with a drawl), this time variation must also be statistically modeled over many speakers when employing only the known technique of using the evolution of spectral power as the discriminating feature for a speech recognition process. Put another way, by extracting a single period of the oscillation in accordance with the method of the invention, the extracted single period can be recreated over any desired number of periods such that slow or fast speech can be easily compared between AFDVs generated by the method of the invention. This comparison is enabled over a desired time scale that has been essentially created and imposed by the renormalization method of the invention. Those of skill in the art will further recognize that it is beneficial that peaks be determined with high resolution, such as through the CSPE techniques described above.

By renormalizing both frequency and time from the spectral representation of the sampled window of the audio signal containing voiced sounds, and forming that renormalized spectral representation as an advanced feature discrimination vector (AFDV) of the invention, wide variations between speakers of the same voiced sound have been essentially eliminated (or at least greatly reduced) from the comparison process in ascertaining the voiced sound being uttered. This reduces the need for statistical models trained on thousands if not millions of speakers, and renders a more robust way of discriminating between voiced sounds.

Once a set of oscillator peak features has been formed as a renormalized AFDV of the invention for a given window of audio input signal (202, FIG. 2) in accordance with the renormalization method of the invention, they can be more easily compared within a common coordinate system with stored AFDVs of known speech sounds by which to determine what phoneme or sub-phoneme is being uttered. Those of skill in the art will recognize that there are many ways that the oscillator peaks of each AFDV can be compared to oscillator peak structures of known speech sounds that have been renormalized into AFDVs in accordance with the normalizing method of the invention.

Figure 5A:
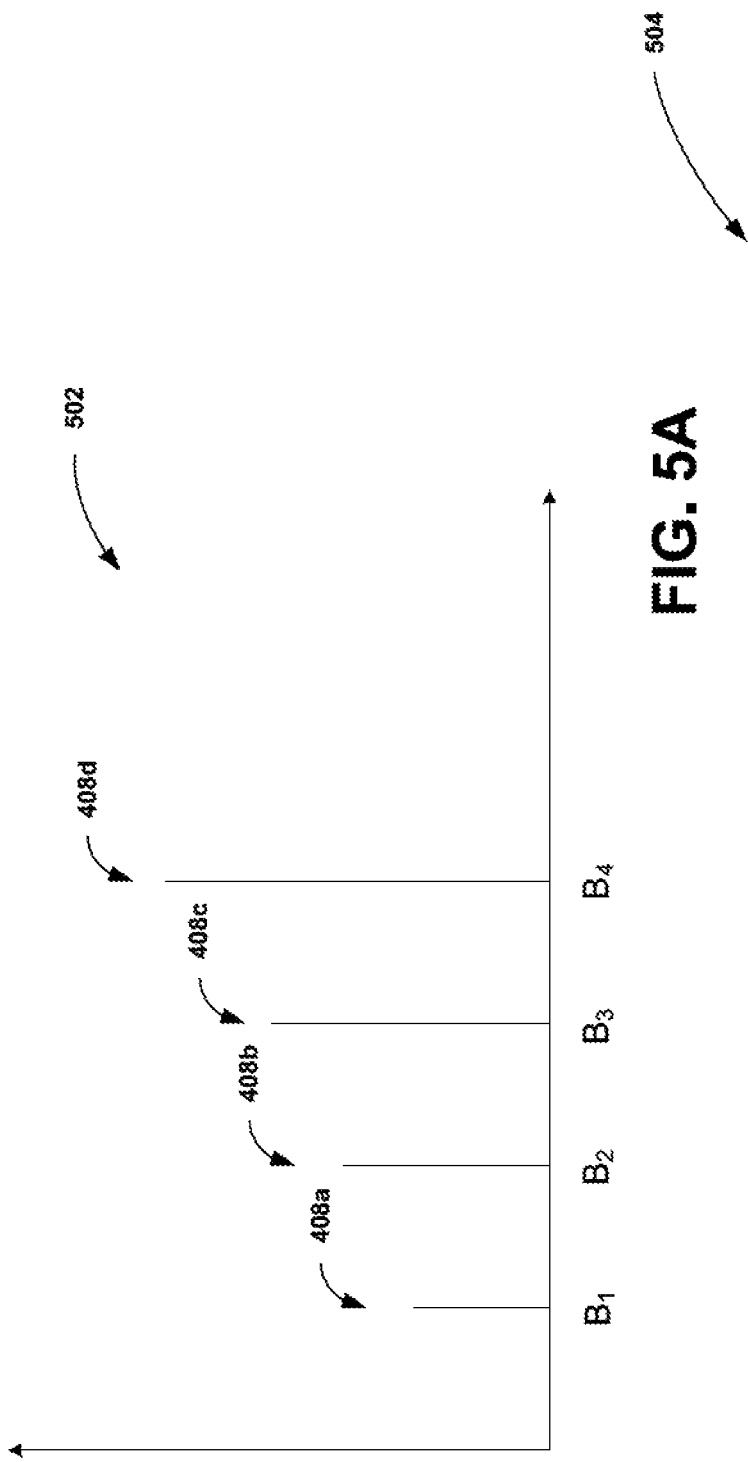
FIG. 5A illustrates an embodiment of spectral structure representing one "glottal pulse" period of the voiced sound from a sampled window of the audio signal of FIG. 4A, renormalized in accordance with the method of the invention.
Figure 5B:
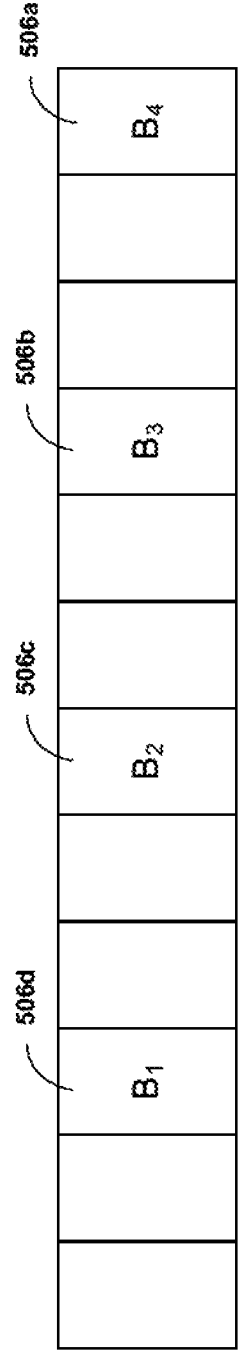
FIG. 5B is an embodiment an n slot comparator stack employed to form an alignment for the spectral structure illustrated in FIG. 5A in accordance with the invention.
Figure 6A:
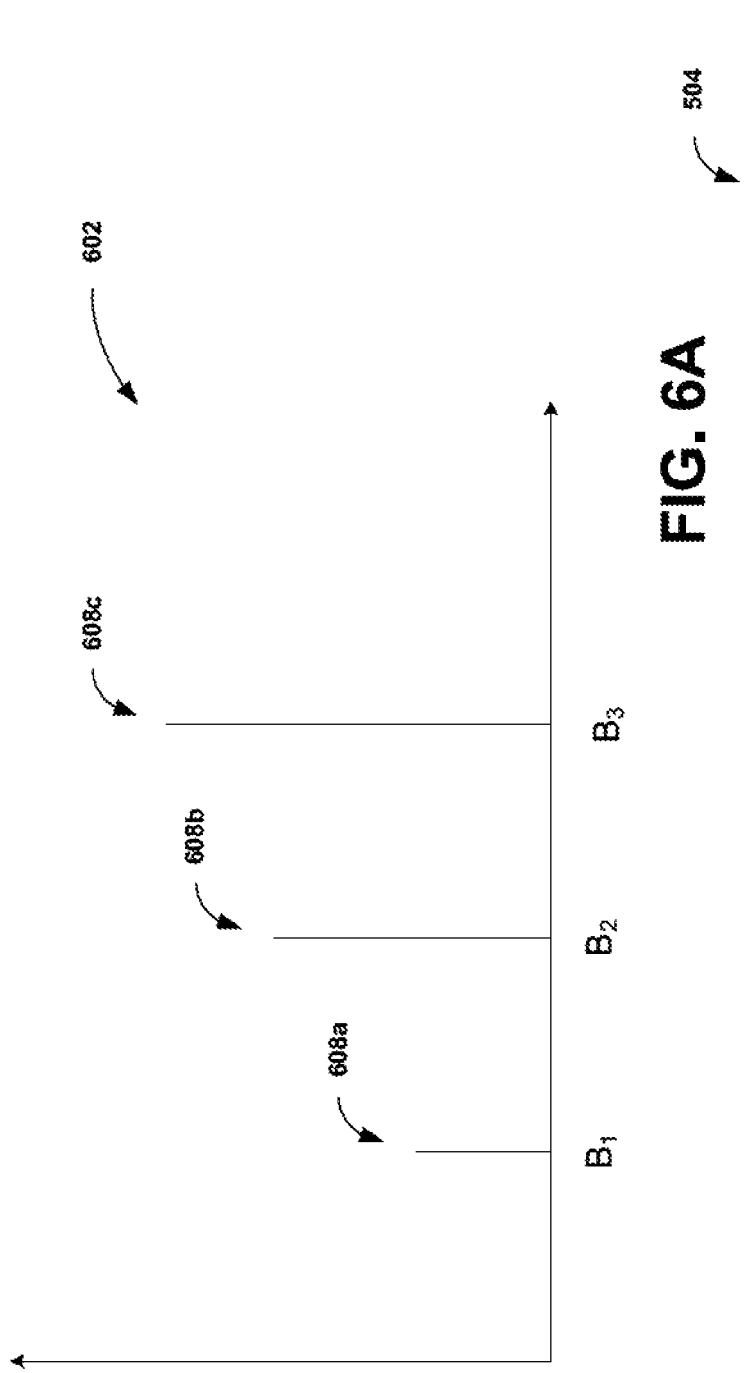
FIG. 6A illustrates an embodiment of a 3 harmonic spectral structure representing one "glottal pulse" period of the voiced sound from a sampled window of an audio signal, renormalized in accordance with the method of the invention.
Figure 6B:
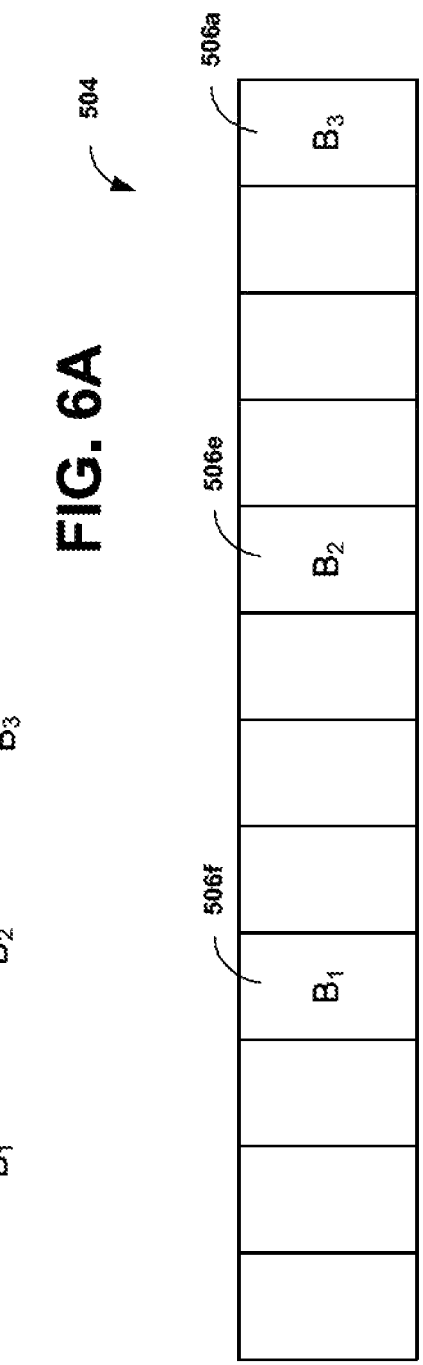
FIG. 6B is an embodiment an n slot comparator stack employed to form an alignment for the spectral structure illustrated in FIG. 6A in accordance with the invention.

One non-limiting embodiment of a means for comparing the AFDVs is to establish an n slot comparator stack 504 of FIGS. 5B, 6B and 7B. In this non-limiting embodiment, the number of slots n is twelve. Based on an empirical study of typical speech sounds encountered, the spectral structure of the sounds often consists of 1, 2, 4 or sometimes 6 oscillator peaks. Thus, a twelve slot comparator stack 504 is able to evenly distribute and form an alignment for each of the spectral structures as illustrated in FIGS. 5A, 6A and 7A. Further, the distribution of the spectral structures would create an alignment where elements with 4 oscillator peaks would largely be unique when compared to elements with 3 oscillator peaks.

In FIG. 5A, the renormalized spectral structure 502 representing one "glottal pulse" period of the voiced sound from a sampled window of audio signal (202, FIG. 2) is illustrative of that of the example of FIG. 4A, having a spectral structure of four oscillator peaks 408*a-d*. These peaks can then be formed into an aligned AFDV that evenly distributes the oscillator peak features into the comparator stack 504 of FIG. 5B such that the oscillator peak of the highest magnitude frequency bin ($B_4$) 408*d* of the AFDV is located in slot 506*a*, the oscillator peak occupying the next frequency bin ($B_3$) 408*c* of the renormalized AFDV is located in slot 506*b*, the oscillator peak occupying the next lowest frequency bin ($B_2$) 408*b* is aligned in slot 506*c* and the oscillator peak falling into lowest frequency bin ($B_1$) 408*a* of the renormalized AFDV is placed or aligned in slot 506*d*, thus occupying the $3^{rd}$, $6^{th}$, $9^{th}$ and $12^{th}$ slots of the comparator stack 504.

In FIG. 6A, the renormalized spectral structure 602 representing one period of the glottal pulse period of a voiced sound from a sampled window of audio signal (202, FIG. 2) has three oscillator peaks 608*a-c*. These peaks can then be formed into an aligned AFDV that evenly distributes the oscillator peak features into the comparator stack 504 of FIG. 6B such that the oscillator peak of the highest magnitude frequency bin ($B_3$) 608*c* of the AFDV is located in slot 506*a*. The oscillator peak occupying the next frequency bin ($B_2$) 608*b* of the renormalized AFDV is located in slot 506*e* and the oscillator peak falling into the lowest frequency bin ($B_1$) 608*a* of the renormalized AFDV is placed or aligned in slot 506*f*, thus occupying the $4^{th}$, $8^{th}$ and $12^{th}$ slots of the comparator stack.

In FIG. 7A, the renormalized spectral structure 702 (generated at 210, FIG. 2) representing one glottal pulse period of a voiced sound derived from a sampled window of audio signal (202, FIG. 2) has two oscillator peaks 708*a-b*. These peaks can then be formed (at 210, FIG. 2) into an aligned AFDV that evenly distributes the oscillator peak features into the comparator stack 504 of FIG. 7B such that the oscillator peak of the highest frequency bin ($B_2$) of the AFDV is located in slot 506*a*. The remaining frequency bin of the renormalized AFDV is located in slot 506*c*, thus occupying only the $6^{th}$ and $12^{th}$ slots of the comparator stack 504.

Those of skill in the art will recognize that structures of one harmonic would be accommodated by placing the single harmonic in the $12^{th}$ slot of comparator stack 504, and for a structure of 6 harmonics, the harmonics would be placed in the $2^{nd}$, $4^{th}$, $6^{th}$, $8^{th}$, $10^{th}$ and $12^{th}$ slots of comparator stack 504. Those of skill in the art will further recognize that the number of slots n can be set to whatever number is considered convenient. Moreover, while the comparator stack is one convenient way to align the vectors for comparison in a common coordinate space as enabled by the method of the invention, any way of establishing a common coordinate system for comparison purposes can be employed without deviating from the intended scope of the invention.

As is known in the art, the AFDVs like other known feature vectors, can be normalized with respect to power, to eliminate variation in the volume of different speakers. One such technique is to normalize the overall power of the oscillator peaks of the AFDV to 1. Those of skill in the art will recognize that one could also normalizing the magnitude of the oscillator peak located at the highest slot location of the comparator stack for each structure to a value of one. Those of skill in the art will recognize that because every case has a peak in the $n^{th}$ slot of the comparator stack 504, it provides little or no discriminatory benefit in performing the comparison, and could therefore be removed.

Once normalized for power, one may then consider the comparator stack 504 as a vector and comparison between the oscillator peaks of each vector and a library of such vectors can be performed. To do so, vectors of known speech sounds can be analyzed and transformed to the same renormalized state in a similarly configured comparator stack, thus building up a library of vectors from the comparator stacks 504. Then, comparison between an unknown speech sound and the library of known speech sounds can be performed by taking a dot product between the AFDV of the unknown sound and the AFDVs of the library to identify which one of the AFDVs in the library is closest to the extracted and renormalized AFDV of the unknown sound. Then the phoneme or sound associated with the AFDV in the library that is identified as most like the extracted AFDV can be chosen as the most likely sound or phoneme being uttered. An example of the normalization procedure by which to enable the comparison of the AFDVs with the dot product will be provided later below.

In embodiments, an unknown sample of a speech utterance may be analyzed using mathematical analysis tools, as described herein. Each frame of data samples may be processed to convert it to the comparison coordinates to produce a feature discriminator vector and then scored against a database of known sounds. In embodiments, the scoring function can be a matrix-vector product of an array of feature discriminator vectors from known training data and the unknown feature discriminator vector that is being evaluated. The highest scoring result may lead to a classification decision about the likelihood that the new frame of data samples is a particular sound from the training data.

Another advantage of the foregoing technique is that because bin locations of each oscillator peak of the AFDVs remains stationary as the sound evolves in time and frequency, the speech recognition engine can also look at the evolution of power over time for those peaks as the sound is uttered. For example, if a person is saying "WELL," the strongest power may typically start out at the lower frequency oscillators of the spectral structure, and then eventually moves toward the higher peaks. At the same time, it is typical that the fundamental frequency will change over the duration of the utterance and hence it moves around in frequency. Because of the renormalization, the oscillator peaks remain stationary in the slots of the stack, so it makes it easier to monitor the evolution of the power through those frequencies, which can provide additional information regarding the phoneme being uttered.

Figure 8:
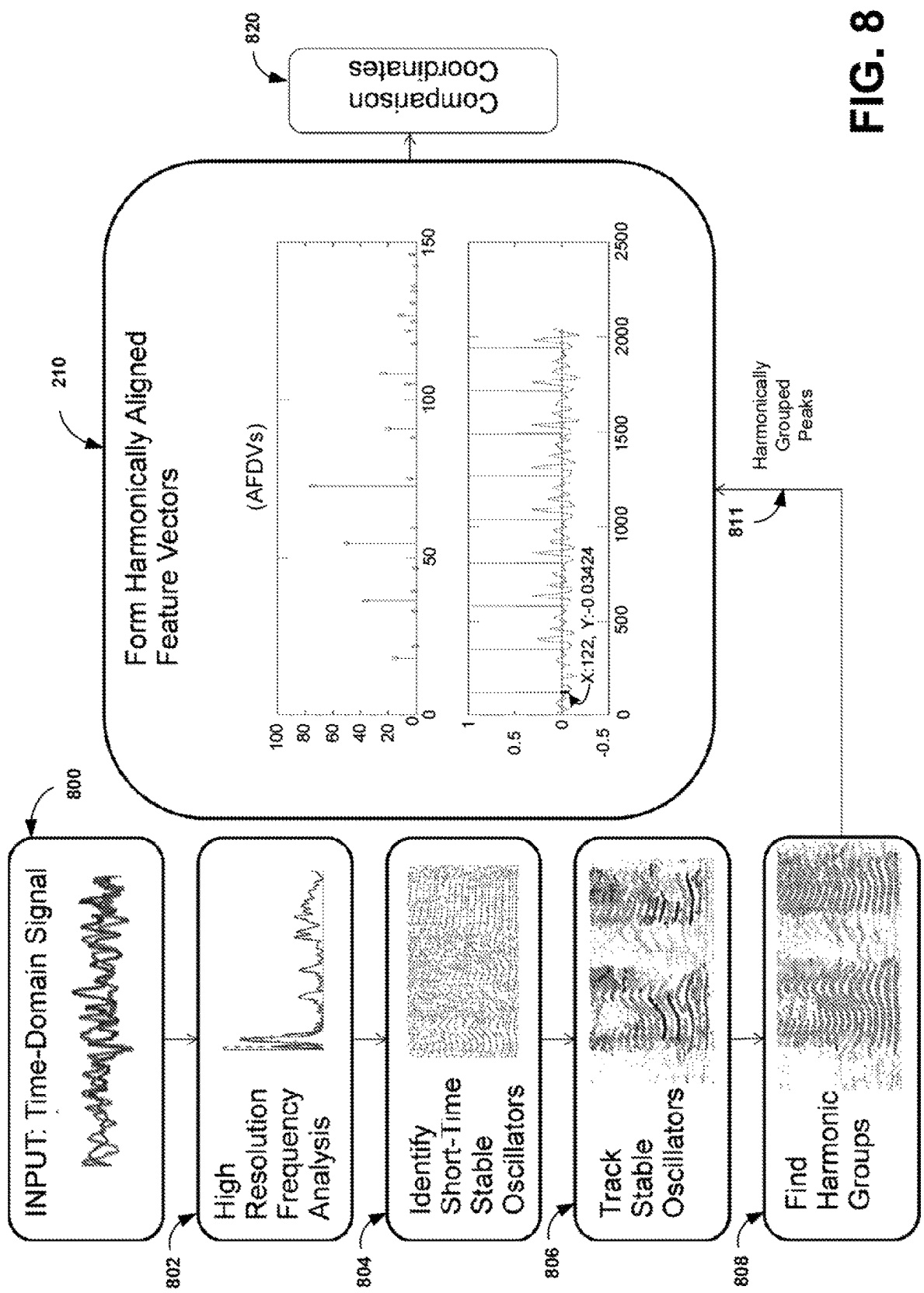
FIG. 8 illustrates a flow diagram of an embodiment of the renormalization method of the invention.

FIG. 8 illustrates a flow diagram of an embodiment of the renormalization method of the invention that generates the AFDVs of the invention. As previously discussed with respect to FIG. 2, an audio signal is received and is sampled into overlapping windows at 800. At 802, the windows of the time domain signal are then converted to a spectral representation of the sample from each window in the form of high resolution oscillator peaks that are determined with sufficient accuracy and at high enough resolution to enable their representation as essentially delta functions. In a preferred but non-limiting embodiment, the high-resolution frequency analysis can, for example, employ the CSPE method disclosed in the publication in the publication by Kevin M. Short and Ricardo A. Garcia entitled "Signal Analysis Using the Complex Spectral Phase Evolution (CSPE) Method" and incorporated by reference herein, In another preferred but non-limiting embodiment, additional refinements to the CSPE method as disclosed in U.S. patent application Ser. No. 13/886,902 entitled "Systems & Methods for Source Signal Separation" and also incorporated herein by reference may also be employed.

At block 804, short-term stabilized oscillators are identified from the oscillator peaks. It should be noted that if certain of the enhancements to the CSPE method as disclosed in U.S. patent application Ser. No. 13/886,902 are employed, frequency and amplitude modulated oscillators can also be identified at this step and used as features in the method of the invention.

At 806, a tracker can be optionally used to track the evolution of the identified oscillators. This can be used, for example, if the speech to be recognized is uttered in a noisy environment in which one or more additional sources of sound exist. By tracking the evolution of the oscillators over time, oscillators that evolve coherently may be determined to be from the same source. Thus, the sound to be analyzed may be further focused to the source of interest, thereby removing the sounds that emanate from the other sources present in the environment. This can further simplify the speech recognition problem, as current systems must not only statistically model the speech to account for variations, to the extent that the speech is not from a clean signal, various types of noise must also be modeled as well.

Those of skill in the art will recognize that there are numerous tracking techniques by which to identify and separate the sounds from various sources, but those techniques, while improving the accuracy of the AFDVs of the invention, are not required for practicing the renormalization process of the present invention.

At 808, harmonically related oscillators are identified and grouped together, for purposes of identifying the harmonic components of the system. With respect to the top plot of FIG. 4A, the harmonically related oscillator peaks are identified (e.g. peaks 408*a*-*d*, FIG. 4A). Those of skill in the art will recognize that this function can be performed by a pitch detector that is able to identify those oscillators that are related to one another as multiples of the fundamental frequency $f_0$ of the signal.

With the harmonically related peaks identified, the harmonic structure (e.g. 502, FIG. 5A) for a single period of the signal is known, an AFDV can be generated for each window of the signal at 210. From there, the AFDVs are aligned through a common coordinate system at 820 so that they can be compared, for example, to a library or corpus of AFDVs for known speech sounds to determine the most likely sound being uttered during the window from which the AFDV was extracted. See the discussion above with respect to an embodiment that employs a comparator stack 504 and using the vector product to identify a match.

Figure 9:
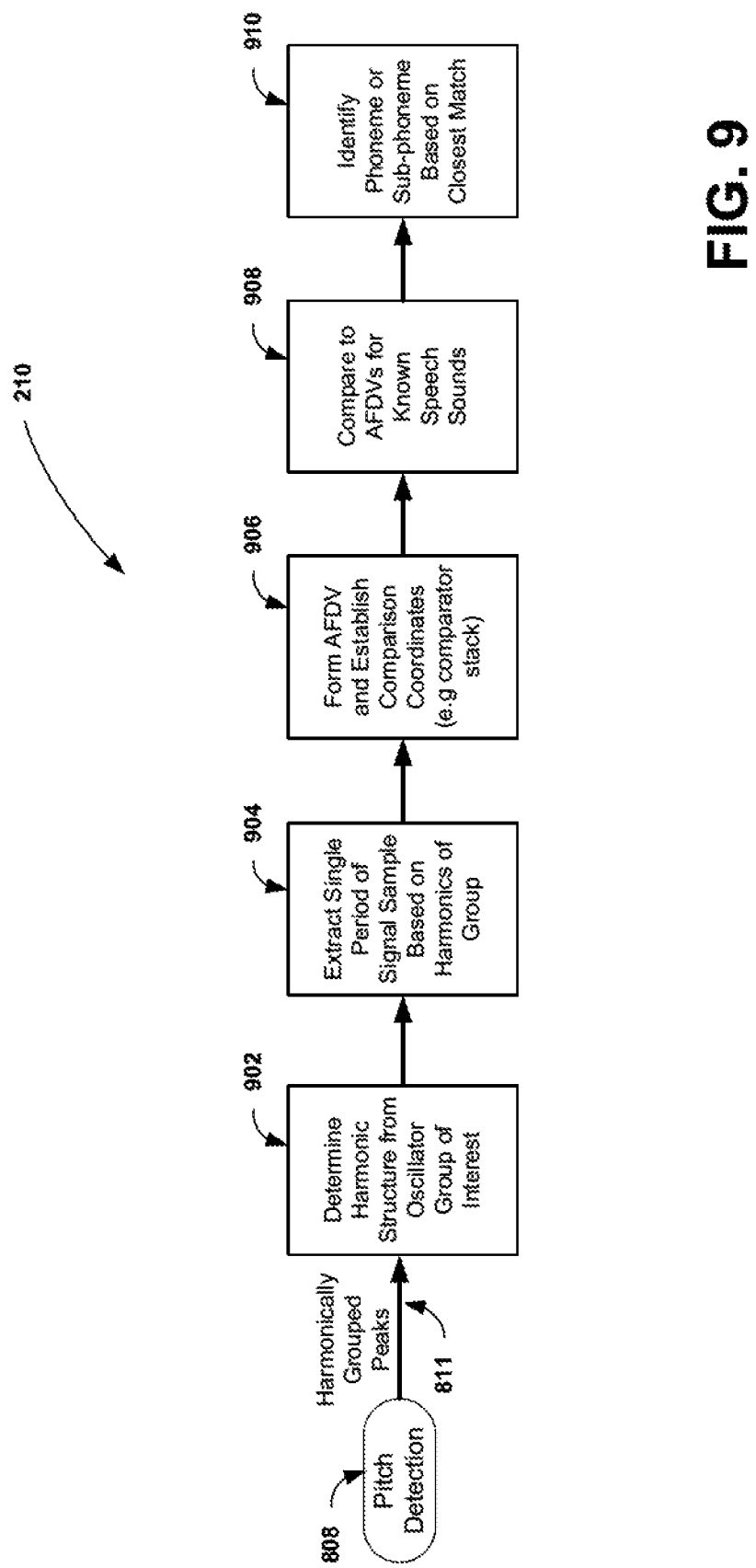
FIG. 9 illustrates a flow diagram of the detailed renormalization steps that occur within the flow diagram of FIG. 8.

FIG. 9 illustrates a flow diagram of the renormalization steps that occur at 210 of FIG. 8. At 902, harmonically grouped oscillator peaks have been identified such as through a pitch detector, and as illustrated by the harmonically related oscillator peaks 408*a*-*d* of FIG. 4A. At 904, these oscillators are placed in consecutive frequency bins as previously discussed to essentially create a single excitation period of the signal that renormalizes both frequency and time. At 906, the AFDVs are placed into an established comparison coordinate structure such as for example, the comparator stack 504 and as illustrated by FIGS. 5B, 6B and 7B.

At block 908, the AFDV for each window can be compared to a library or corpus of known speech that has itself been coded into AFDVs of the invention. The comparison can be any technique well-known in the art, such as by a dot product between the AFDV extracted from a window and the library of known AFDVs as previously described. The result of that comparison can then be an output of an identification of the most likely phoneme or sub-phoneme based on the closest match. Those of skill in the art will recognize that other types of comparisons may be used here, such as, but not limited to, a Bayesian decision, a Mahalanobis distance, or a weighted or curved space distance metric may be used.

Figure 10:
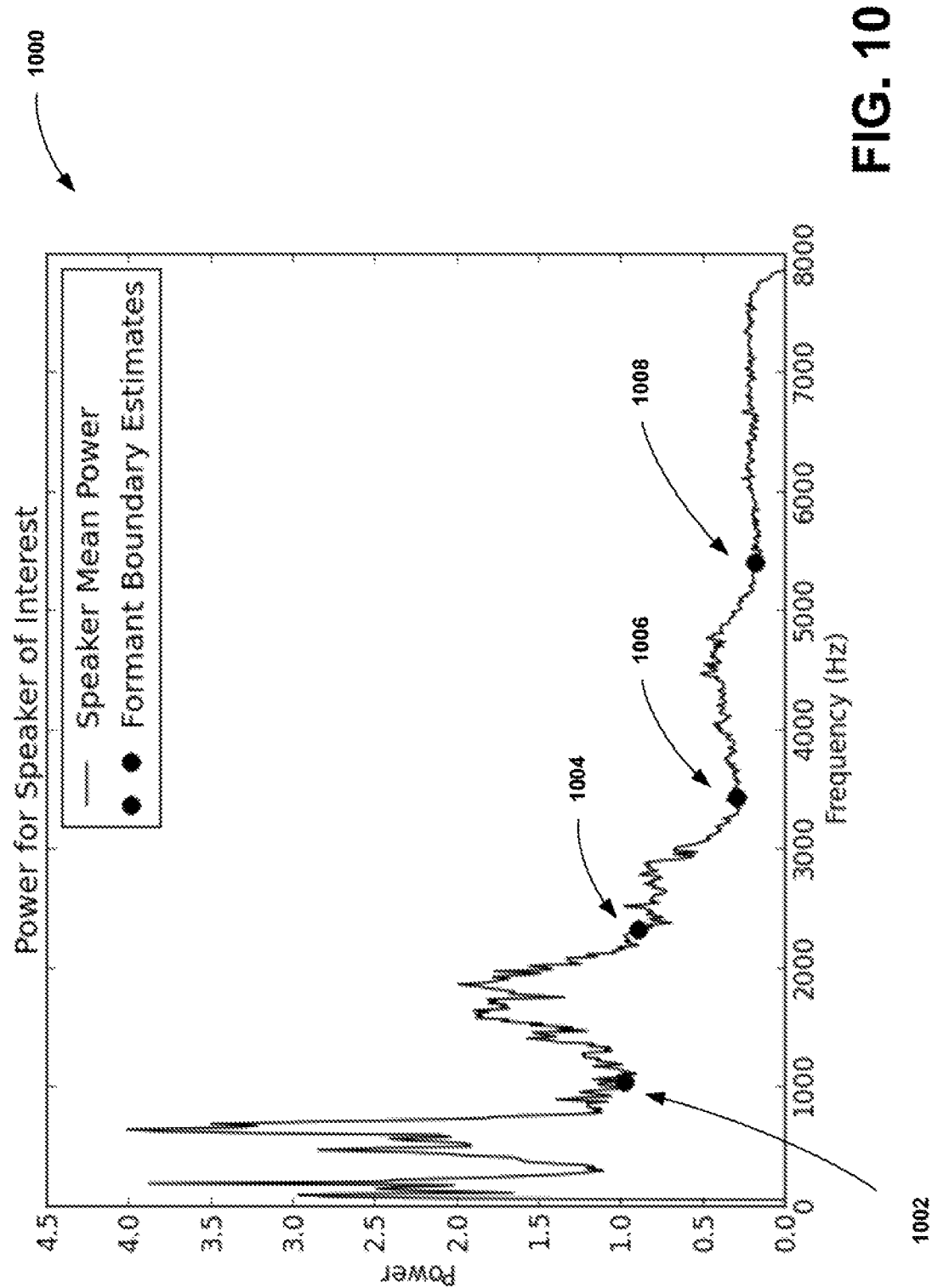
FIG. 10 is an illustration of various frequency zones of a power spectrum that has been averaged over many utterances for a single speaker.

As previously discussed, speech recognition systems often find it useful to categorize phonemes into three broad types: voiced phonemes, semi-voiced phonemes, and unvoiced phonemes. In FIG. 10, one can see a power spectrum 1000 that has been averaged over many utterances for a single speaker. As illustrated, there are several zones that are delimited by the large dots in the figure. These zones roughly correspond to the resonances of the speaker's vocal tract and are affected by the size, gender, mouth shape, etc., of the given speaker.

In the first two zones as delineated by dots 1002 and 1004 (i.e. where zone 1 is from 0 Hz-1100 Hz approximately and zone 2 is from 1100 Hz-2200 Hz, approximately), the individual spectra that are included in the average would tend to be produced by voiced phonemes (and the individual spectra would have harmonically grouped oscillator peaks as illustrated in the examples above). For unvoiced phonemes, the signal power in the individual spectra would largely be confined to zones 4 and 5 as delineated by dots 1006 and 1008. For semi-voiced phonemes, there can be signal power in most of the zones, including zone 3 defined between dots 1004 and 1006.

As previously pointed out, voiced sounds behave in a mostly periodic (and therefore harmonic manner) in accordance with the glottal pulse and are typically vowel type phonemes and sub-phonemes. Thus, for ease of illustration, the renormalization method of the invention as set forth above has been demonstrated using examples of speech where the dominant signal has been a voiced phoneme like a vowel sound. In those cases, it is fairly straightforward to find a group (performed at 808, FIG. 8) of oscillator peaks that are harmonically related (e.g. groupings 502, FIG. 5A; 602, FIG. 6B and 702, FIG. 7B and to map them neatly into the appropriate slots in the comparator stack (504, FIGS. 5*b*, 6*b* and 7*b*).

Because unvoiced phonemes (e.g. sibilants), are primarily turbulent in nature, they tend to lack clearly defined, well-behaved harmonic structure such as that exhibited by voiced sounds. The individual spectra tend to be smeared out and when analyzed as oscillator peaks, there are groupings of the peaks, but they do not exhibit the even spacing of the harmonics that one would expect for voiced phonemes. For semi-voiced phonemes, such as fricatives and plosives, there are actually sets of oscillator peaks that are similar to those of the groups of harmonics (i.e. a voiced component), as well as a generally higher frequency set of oscillator peaks that correspond to unvoiced sibilant-like spectral components as well. For semi-voiced phonemes, there can be signal power in most of the zones, often with oscillator peaks grouped harmonically in zones 1 and 2 and less harmonically grouped phonemes in zones 3, 4 and 5.

Figure 11:
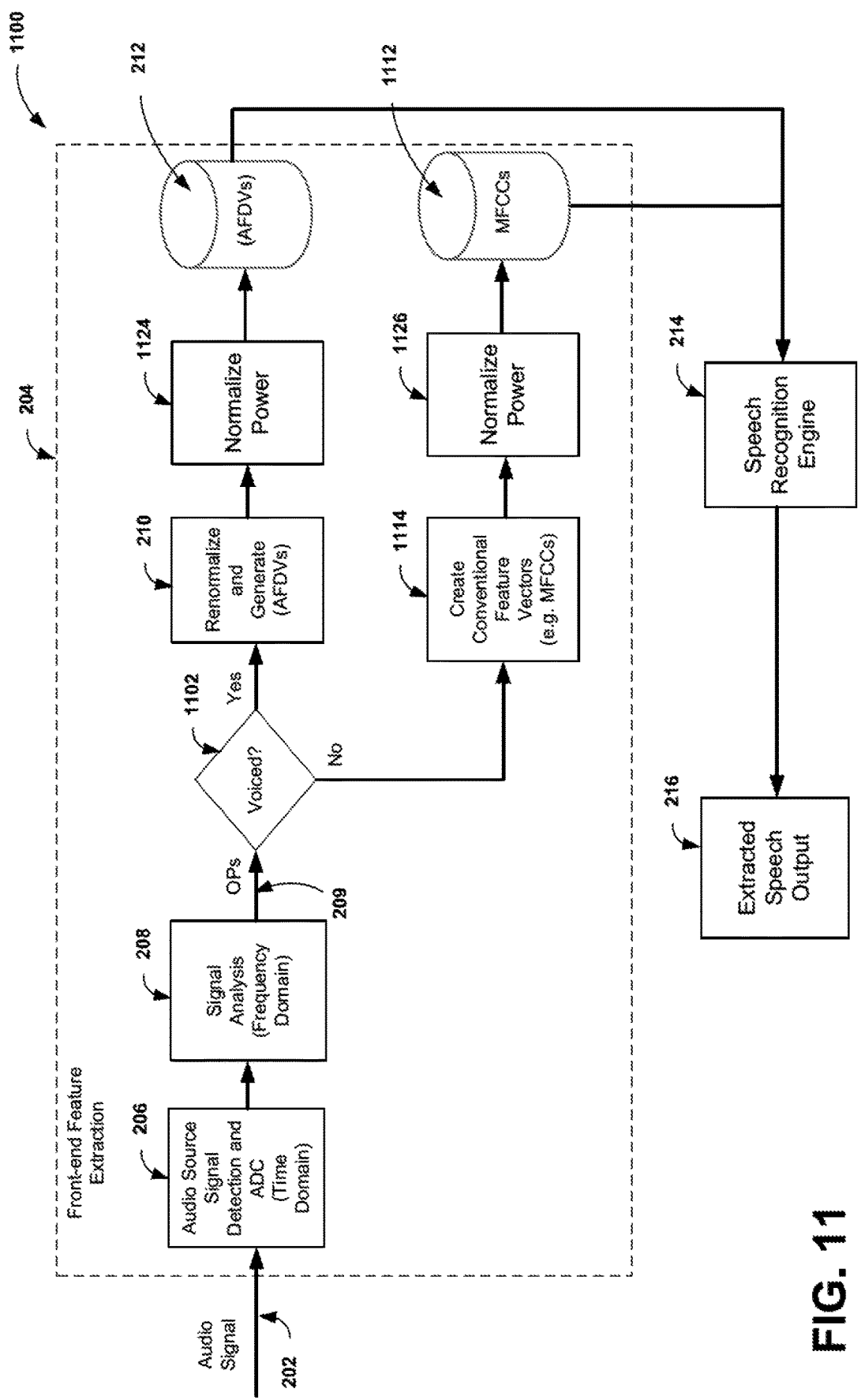
FIG. 11 illustrates an embodiment of a speech recognition system that can employ the AFDVs of the invention for identifying voiced sounds in conjunction with more traditional feature vectors (e.g. MFCCs) used for identifying unvoiced and semi-voiced sounds.

Based on the foregoing, those of skill in the art will appreciate that the foregoing method of the invention by which oscillator peak feature vectors are renormalized to create AFDVs of the invention that eliminate from the speech recognition comparison process variations in frequency and time duration of speech, is therefore most easily applied to identifying vowel sounds. Thus, in a non-limiting body of the invention, the renormalization method of the invention can be used to generate AFDVs of the invention for identifying voiced sounds, to be used in conjunction with known techniques for extracting known feature vectors such as MFCCs as previously discussed. FIG. 11 illustrates a non-limiting embodiment of a speech recognition system 1100 that can employ the AFDVs of the invention to improve the robustness of identifying voiced sounds, while more traditional feature vectors (e.g. MFCCs) can be used for identifying unvoiced sounds such as sibilants. A detailed discussion of FIG. 11 will be presented below.

Notwithstanding the foregoing, the method of the invention and the AFDVs of the invention generated therefrom, can still be extended to apply more broadly to identifying both unvoiced and semi-voiced sounds as well. A non-limiting embodiment of a speech recognition system 1200 that can employing the AFDVs of the invention for identifying voiced sounds, as well as unvoiced and semi-voiced sounds will be discussed below with reference to FIG. 12.

With respect to FIG. 11, a non-limiting embodiment of a speech recognition system 1100 is illustrated that employs the method of the invention to generate AFDVs of the invention for improving the robustness of identifying voiced sounds, but extracting known feature vectors such as MFCCs for identification of sounds in the higher frequencies. The two different feature vector types can also be used coextensively to identify semi-voiced sounds that include both voiced and unvoiced components.

Oscillator Peaks 209 are extracted from signal 202 as previously discussed, and it is determined at decision block 1102 whether the extracted oscillator peaks are voiced in nature. This can be determined by a number of ways, including whether they can be grouped harmonically and whether most of the power of the oscillator peaks falls within the first two zones of FIG. 10. If yes, AFDVs 212 of the invention are generated in accordance with the renormalization method of the invention at 210. They are then normalized with respect to power at 1124 and provided to speech recognition engine 214 for use in identifying voiced sounds such as vowels.

If the answer at decision block 1102 is no, the conventional feature vectors such as MFCCs 1112 can be generated at 1114, normalized as to power at 1126, and then are provided to speech recognition engine 214 for identifying unvoiced and possibly semi-voiced sounds. Thus, in such an embodiment, the standard feature vectors such as MFCCs can be used to identify unvoiced sounds such as sibilants, while the AFDVs 212 of the invention can be used to simply improve the robustness of identifying voiced sounds. Those of skill in the art will recognize that it might be beneficial to employ both features in combination improve the identification of semi-voiced sounds such as plosives and fricatives. This can be accomplished at least in part by maintaining the ratio of spectral power between the two for each window of sampled signal. A technique for accomplishing this result is set forth in detail below.

Figure 12:
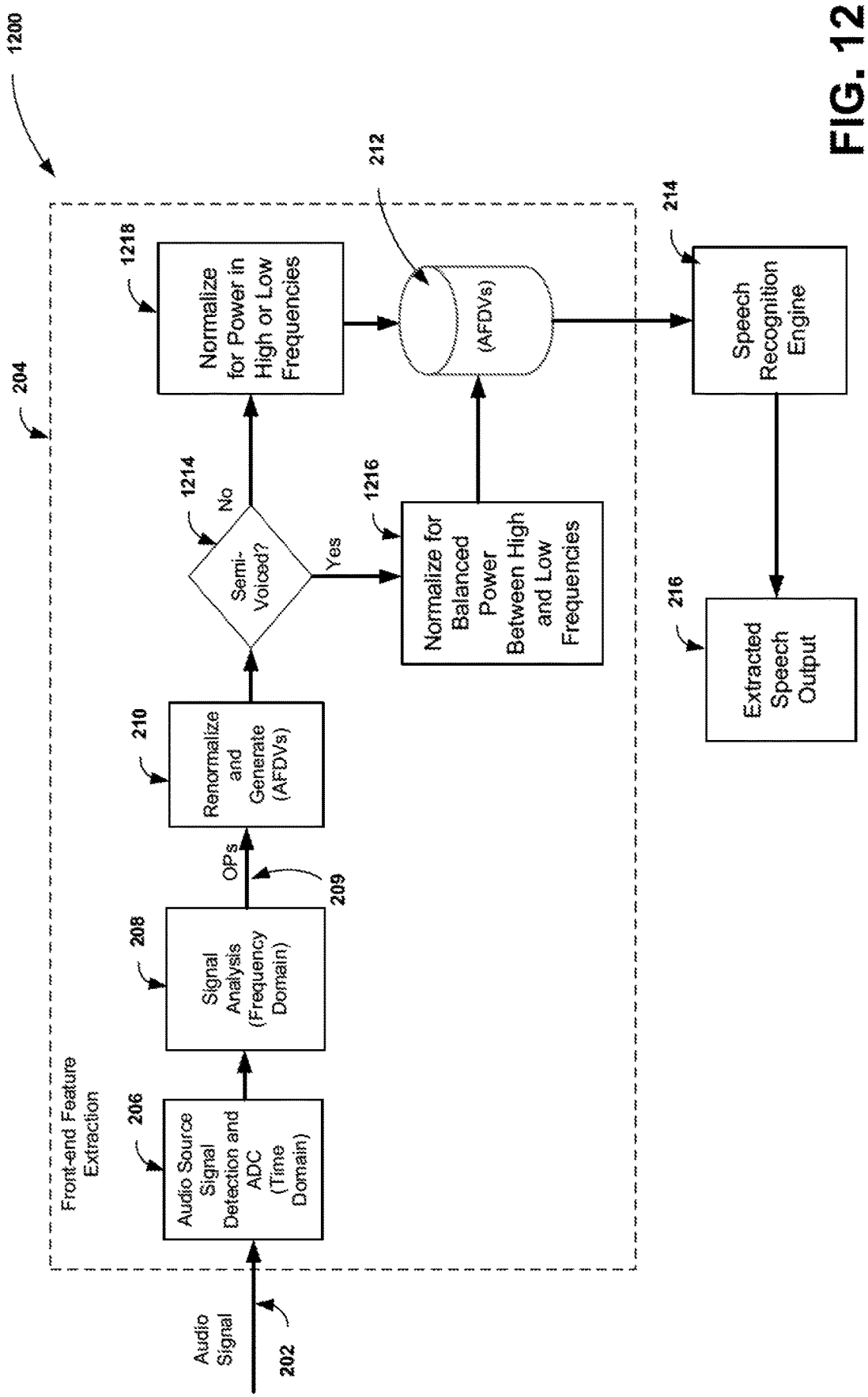
FIG. 12 illustrates an embodiment of a speech recognition system that employs the method of the invention to generate AFDVs of the invention for identifying voiced, unvoiced and semi-voiced sounds.

FIG. 12 illustrates a non-limiting embodiment of a speech recognition system 1200 that employs the method of the invention to generate AFDVs of the invention for identifying all three categories of sound. Oscillator Peaks 209 are extracted from signal 202 as previously discussed, and AFDVs 212 of the invention are generated in accordance with the renormalization method of the invention at 210. To differentiate between the voiced, semi-voiced and unvoiced categories, it can be advantageous to establish a unique comparator stack 504 (i.e. establishing comparison coordinates) for each of the three categories of sound.

This can be accomplished by treating the comparator stack in separate zones, or in separate pieces, or in any combination that makes it easier to compare the measured sounds with the library/corpus of sounds that will be used to identify the phonemes. In one embodiment, one may consider two subdivisions of the comparator stack 504, with zone 1 and 2 in a first subdivision and zones 3, 4 and 5 in a second subdivision. In this embodiment, one would expect the power of the oscillator peaks 209 for voiced phonemes to be essentially confined to the first subdivision.

As previously discussed, the first subdivision of the comparator stack is employed as previously described for identified groups of oscillator peaks that are harmonically related. With respect to those higher frequency, non-harmonically related oscillator peaks, the oscillator peaks will be smeared over the spectrum as they will not be as well-behaved as the harmonically related oscillator peaks for voiced sounds. Thus, for example, one can establish contributions to comparator stack slots for nearby oscillator peaks based on their weighted average to establish entries in the slots in much the same way as performed for MFCC features. One of skill in the art will recognize that any group of oscillator peaks that is not harmonically related could be renormalized as before, but this often undesirable at the higher frequencies.

The weighted average frequency entries (or each individual oscillator peak if desirable) may then be renormalized by shifting them to adjacent frequency bins starting with bin 1 as previously described above for harmonically related oscillator peaks. These bins can then be distributed into the second subdivision of the stack in the same manner as for harmonically related oscillator peaks as described above to establish a common coordinate comparison space for the non-harmonically related oscillator peaks as well.

Thus, for voiced phonemes all of the signal power is essentially restricted to the first subdivision. Likewise, unvoiced phonemes will typically be confined to the second subdivision of the stack, and semi-voiced phonemes will typically have power in both subdivisions. During the comparison process, it may be beneficial for voiced phonemes to ignore the second subdivision completely. Likewise, it may be beneficial for unvoiced phonemes to ignore the first subdivision of the stack completely. This means that when normalizing the AFDVs for power in both of those cases, no consideration need be given to the other subdivision. Thus, if the answer at decision block 1214 of FIG. 12 is no, the power normalization performed at block 1218 can be as previously discussed, such as normalizing the overall power to a value of 1.

For the semi-voiced phonemes however, one must consider both subdivisions. In this case, it becomes necessary to balance the division of the signal power for both subdivisions when normalizing them for power. Thus, if the answer at decision block 1214 of FIG. 12 is yes, the power normalization performed at block 1216 of FIG. 12 should be performed such that the overall ratio of power between the subdivisions is maintained. A preferred embodiment for the process for balancing the power between subdivisions as performed at block 1216 is given below.

As an exemplary implementation, we present the case where there are two zones of frequencies under consideration. We start with a set of amplitudes of the oscillator peaks from the resynthesis file: $\{v_1, v_2, v_3, \ldots, v_n\}$. Overall magnitude $\text{Mag} = [v_1^2 + v_2^2 + v_3^2 + \ldots + v_n^2]^{1/2}$ and let the set of amplitudes of the oscillator peaks be grouped into two zones $\{v_1, v_2, v_3, \ldots, v_A\}$ and $\{v_{A+1}, v_{A+2}, v_{A+3}, \ldots, v_n\}$, where the union of these two subsets gives the original set. Since the original set has simply been divided into two zones, we see that $\text{Mag}^2 = v_1^2 + v_2^2 + v_3^2 + \ldots + v_A^2 + v_{A+1}^2 + \ldots + v_n^2$. Let partial sums $[v_1^2 + v_2^2 + v_3^2 + \ldots + v_A^2]$ be represented by $\alpha^2$ and partial sums $[v_{A+1}^2 + \ldots + v_n^2]$ be represented by $\beta^2$. We can then normalize by taking $$\alpha^2, \beta^2 \rightarrow \frac{\alpha^2}{\alpha^2 + \beta^2}, \frac{\beta^2}{\beta^2 + \alpha^2}$$

and apply the rescaling to the separate zones that have been created in accordance with the method of the invention. Thus, the normalized magnitude is 1, since $$\text{Mag}_{norm}^2 = \frac{v_1^2 + v_2^2 + v_3^2 + \ldots + v_A^2}{\alpha^2 + \beta^2} + \frac{v_{A+1}^2 + \ldots + v_n^2}{\alpha^2 + \beta^2} = 1.$$

Note that the magnitude information about the separate zones is retained in $\alpha$ and $\beta$.

To treat parts separately while maintaining the power ratio, let $V_{LF}^V[v_1, v_2, \ldots, v_A]$ and $V_{HF}^V = [v_{A+1}, \ldots, v_n]$. Then normalize both parts, giving $$V_{LF_{norm}}^V = \frac{V_{LF}^V}{\|V_{LF}^V\|} = \frac{v_1^2 + v_2^2 + v_3^2 + \ldots + v_A^2}{\sqrt{v_1^2 + v_2^2 + v_3^2 + \ldots + v_A^2}};$$

$$V_{HF_{norm}}^V = \frac{V_{HF}^V}{\|V_{HF}^V\|} = \frac{v_{A+1}^2 + \ldots + v_n^2}{\sqrt{v_{A+1}^2 + \ldots + v_n^2}}, \text{ where } V_{LF_{norm}}^V \text{ and }$$

$$V_{HF_{norm}}^V \text{ have a magnitude} = 1.$$

If we consider rescaling to the original ratios, then $$V_{renorm}^V = \left[\sqrt{\frac{\alpha^2}{\alpha^2 + \beta^2}} V_{LF_{norm}}^V, \sqrt{\frac{\beta^2}{\alpha^2 + \beta^2}} V_{HF_{norm}}^V\right] \text{ and}$$

$$\|V_{renorm}^V\|^2 =$$

$$\frac{\alpha^2}{\alpha^2 + \beta^2} V_{LF_{norm}}^V \cdot V_{LF_{norm}}^V + \frac{\beta^2}{\alpha^2 + \beta^2} V_{HF_{norm}}^V \cdot V_{HF_{norm}}^V = \frac{\alpha^2 + \beta^2}{\alpha^2 + \beta^2} = 1.$$

If this is extended to the case of feature vectors, only some subset of the peaks may be used and the LF frequency axis (zone 1 axis) can be rescaled independently of the HF axis (zone 2 axis), but the power ratio is maintained. Assuming that $\alpha$ and $\beta$ are known ahead of time, there is great flexibility in how the feature vectors can be projected to different representations, while maintaining an overall power relationship between the different feature vectors. For instance, if it is desirable to consider more than one zone, but a balance of power is important to maintain then the following adjustments may be made, where $V_{LF}^V \rightarrow V_{LF_{norm}}^{\%}$ and $V_{HF}^V \rightarrow V_{HF_{norm}}^{\%}$, where the tilde represents that the data has been rescaled. The balanced form that ensures consistent overall normalization then becomes $$V_{LF_{norm}}^{\%} = \frac{\alpha}{\sqrt{\alpha + \beta}} V_{LF_{norm}}^V \text{ and}$$

$$V_{HF_{norm}}^{\%} = \frac{\beta}{\sqrt{\alpha + \beta}} V_{HF_{norm}}^V \text{ giving}$$

$$V_Z^V = [V_{LF_{norm}}^{\%},$$

$$V_{HF_{norm}}^{\%}] = \left[\frac{\alpha}{\sqrt{\alpha + \beta}} V_{LF_{norm}}^V, \frac{\beta}{\sqrt{\alpha + \beta}} V_{HF_{norm}}^V\right] \rightarrow \|V_Z^V\|^2 = 1.$$

The subscript "Z" is added to indicate that the result is a zone-based representation of the information in the oscillator peak representation.

Those of skill in the art will recognize that the foregoing technique can also be applied when the two feature vectors are a mix between an AFDV of the invention, and a conventional feature vector such as an MFCC.

Commercial Applications

In accordance with a non-limiting embodiment, a source separated signal generated using any process or combination of the previously described techniques herein may generate outputs presented as: (i) an audio file; and/or (ii) audio signal components; and/or (iii) speech feature vectors, all of which alone or in combination can serve as the inputs to a speech recognition engine or biometric voice identification system. The Advanced Feature Discrimination Vectors described herein, used independently of or in combination with Short & Hone's Systems and Methods for Source Signal Separation, may be utilized in speech recognition systems which may be used to: translate spoken words into text; control automated systems through voice translation; or convert spoken words into other outputs other than voice through an automated process. Introduction of Advanced Feature Discrimination Vectors to improve speech and voice recognition can be applied independent of any other algorithms and systems used to improve recognition, or in conjunction with one or more of such systems. Additionally, Advanced Feature Discrimination Vectors can be applied to: original voice source signals that have been converted to digital signals and reconverted to analog signals prior to once again being converted to digital to be processed for speech recognition; or, to the audio signal once it has been converted to digital immediately prior to the speech recognition process.

As used herein, speech recognition may be referred to as "automatic speech recognition" ("ASR"), "computer speech recognition", and/or "speech to text". These systems may use training ("Speaker Dependent") or not use training by a speaker (referred to as "Speaker Independent" systems). Voice recognition generally refers to finding the identity of who is speaking, in contrast to what they are saying. Recognizing the speaker can simplify the task of translating speech in speaker dependent systems or it can be used to authenticate or verify the identity of a speaker as part of a security process.

The methodology applied to speech recognition may first rely on the conversion of an analog voice signal into digital audio and then into recognized speech through the following process: (i) transform the digital audio into a better acoustic representation; (ii) apply rules so the speech recognizer knows what phonemes to expect; (iii) determine which phonemes are spoken; and (iv) convert the phonemes into words. The digital audio format may vary in terms of number of channels (e.g. mono vs. stereo), bitrate, and/or other characteristics.

In speech recognition, as described herein, feature vectors may be extracted from speech waveforms. Typically, this is accomplished by first transforming the digital audio into the "frequency domain" using a windowed Fast-Fourier Transform (FFT), with a resulting output similar to what a spectrograph produces. In this domain, the frequency components of a sound for a given sample rate may be used to generate a graph of the amplitudes of frequency components for that sample. A feature vector may be computed from a window of speech signals in every short time interval, and an utterance may be represented as a sequence of these feature vectors.

In embodiments, an automated speech recognizer engine may include a database of thousands of such graphs correlated to different types of sounds produced by the human voice, and the graph generated at that sample may be matched against the database, producing a number that describes the sound. The most likely word sequence for the given speech feature vectors may be found using two types of knowledge sources, i.e., acoustic knowledge and linguistic knowledge. Speech recognition engines, as described herein, may use a mathematical technique called "Hidden Markov Models" (HMMs) for the acoustic features of speech sound and the stochastic language model may be used to represent linguistic knowledge.

Interferers such as loud background noise or other ambient environmental sounds can often lead to misinterpretation of the source, resulting in the recognizer determining a different vector than it would have if the user were in a quiet room with a high-quality microphone. Traditionally, background noise and variability problems are addressed using statistical models to figure out which phoneme is spoken; however, with strong interference the results are generally poor.

Introduction of Advanced Feature Discrimination Vectors, as described herein, with or without Systems and Methods for Source Signal Separation in the initial steps of the recognition process, whereby the feature vectors are extracted from speech waveforms, can greatly increase the robustness of determining the phonemes and utterances with a much higher confidence than other approaches. Application of Advanced Feature Discrimination Vectors can greatly mitigate the impact of interferers like ambient noise when extracting the feature vectors from the digital audio signal. Source Signal Separation processed signals with Advanced Feature Discrimination Vectors, as described herein, offer higher accuracy for voice recognition/identification and may be introduced into any existing voice recognition or voice security system, using either onboard processing (as with cell phone, tablet and other personal device security features) or linked to a network or cloud for controlled access devices or areas (e.g. restricted access facilities, buildings, vaults or other secured locations).

For voice/speaker recognition, similar processes may be used to extract feature vectors of the speaker of interest; however, these vectors may be compared and contrasted to a model/library of utterances originally created by the speaker, and a similarity score may be generated. Advanced Feature Discrimination Vectors with or without Source Separation technology can be introduced to voice recognition to enhance the robustness of the scoring by mitigating interference such as background noise or competing conversations by delivering improved feature vectors through either: (i) application to the original voice source signals that have been converted to digital signals and reconverted to analog signals prior to once again being converted to digital to be processed for speech recognition; or, (ii) application to the audio signal once it has been converted to digital immediately prior to the voice recognition process. Advanced Feature Discrimination Vectors methods and systems described herein may be implemented as hardware or software on any PC, cell phone, tablet, or other system using voice/speech recognition, as a stand-alone processing technique or a add-on to existing software program.

In accordance with exemplary and non-limiting embodiments, an Advanced Feature Discrimination Vectors representation of signal elements may be developed in a model of a signal. The signal may be decomposed and grouped into tracks and/or tracklets corresponding to individual speakers, and the decomposed signal transformed into Advanced Feature Discrimination Vectors adapted for use in a speech recognition engine. In such embodiments, one might develop and introduce a bias toward a specific speaker (e.g. the owner of a phone), so as to automatically pull out their speech and enhance it over all other sounds in the environment.

In another embodiment, a representation of signal elements which may be referred to as speech features or Advanced Feature Discrimination Vectors may be developed in a source signal separation model of a signal. The Advanced Feature Discrimination Vectors corresponding to individual speakers, and the decomposed representation used as an input to a speech recognition engine or biometric voice identification system.

In accordance with exemplary and non-limiting embodiments, a system comprises a sound gathering device, such as a microphone, with a nearby processor for engaging in cooperative/distributed computing of Advanced Feature Discrimination Vectors with or without source signal separation. In some embodiments, the algorithm is scalable to be less processing-intensive so it can be used on cellular phones, smartphones, tablets or other mobile devices. In some embodiments, some of the processing may be conducted on the mobile device and then be distributed or transmitted to a remote processor or server with results then delivered back to the mobile device.

What is claimed is:

1. A computer-implemented method of generating advanced feature discrimination vectors (AFDVs) representing sounds forming at least part of an audio signal input to a local device, the local device being in the same environment as at least one source of the audio signal, wherein the method is performed by a controller of the local device and comprises:
   taking a plurality of samples of the audio signal, the plurality of samples being a portion of the audio signal as it evolves over a window of predetermined time;
   for each sample of the audio signal taken:
      performing a signal analysis on the sample to extract one or more high resolution oscillator peaks therefrom, the extracted oscillator peaks forming a spectral representation of the sample;
      renormalizing the extracted oscillator peaks to eliminate variations in the fundamental frequency and time duration for each sample occurring over the window;
      normalizing the power of the renormalized extracted oscillator peaks; and
      forming the renormalized and power normalized extracted oscillator peaks into a respective AFDV for the sample; and
      outputting the respective AFDV to a comparison function configured to identify a characteristic of the sample based on a comparison of the respective AFDV with a library of AFDVs associated with known sounds and/or known speakers, wherein the spectral representation of the sample is associated with a single glottal pulse period, and wherein each AFDV in the library also comprises a spectral representation associated with a single glottal pulse period.

2. The method of claim 1, wherein the library of AFDVs is stored in memory of the local device, and wherein the comparison function is a function implemented by the local device.

3. The method of claim 1, wherein the comparison function is a function implemented by a remote processor, wherein outputting the respective AFDV comprises transmitting the respective AFDV to the remote processor, and wherein the method comprises receiving the identified characteristic from the remote processor.

4. The method of claim 3, wherein the respective AFDV is transmitted to the remote processor in an encrypted form.

5. The method of claim 1, wherein at least some of the AFDVs in the library is associated with a known speech sound, and wherein the method comprises outputting the identified characteristic to a speech recognition engine configured to perform at least one of: translate spoken words into text; control automated systems through voice translation; or convert spoken words into outputs other than voice through an automated process.

6. The method of claim 5, wherein at least some of the AFDVs in the library is associated with a single word or short phrase, and wherein the speech recognition engine is configured to identify a keyword based on the identified characteristic being a single word or short phrase.

7. The method of claim 6, comprising using the identified keyword to control at least one of: the local device, an application controlled by the local device, or a remote device or system connected to the local device.

8. The method of claim 1, wherein at least some of the AFDVs in the library is associated with a known speaker, and wherein the method comprises outputting the identified characteristic to a voice identification engine configured to identify a speaker of the sample.

9. The method of claim 8, comprising using the identified characteristic to authenticate or verify the identity of the speaker of the sample as part of a security process.

10. The method of claim 1, wherein the local device is a mobile device.

11. The method of claim 10, wherein the mobile device is one of: a cellular phone, a smartphone, a tablet or a personal computer.

12. The method of claim 1, wherein the signal analysis employs complex spectral phase evolution (CSPE).

13. A computer-implemented method of generating advanced feature discrimination vectors (AFDVs) representing sounds forming at least part of an audio signal input to a local device, the local device being in the same environment as at least one source of the audio signal, wherein the method is performed by a controller of the local device and comprises:
   taking a plurality of samples of the audio signal, the plurality of samples being a portion of the audio signal as it evolves over a window of predetermined time;
   for each sample of the audio signal taken:
      performing a signal analysis on the sample to extract one or more high resolution oscillator peaks therefrom, the extracted oscillator peaks forming a spectral representation of the sample;
      renormalizing the extracted oscillator peaks to eliminate variations in the fundamental frequency and time duration for each sample occurring over the window;
      normalizing the power of the renormalized extracted oscillator peaks; and
      forming the renormalized and power normalized extracted oscillator peaks into a respective AFDV for the sample; and
      outputting the respective AFDV to a comparison function configured to identify a characteristic of the sample based on a comparison of the respective AFDV with a library of AFDVs associated with known sounds and/or known speakers, wherein said renormalizing of the extracted oscillator peaks comprises representing the oscillator peaks in a common coordinate system, wherein each of the AFDVS in the library is also represented in the common coordinate system, and wherein the common coordinate system comprises a common frequency scale or a common time scale.

14. The method of claim 13, wherein the representation of each AFDV in the common coordinate system comprises a predetermined number of excitations periods.

15. The method of claim 13, wherein said representing of the oscillator peaks in the common coordinate system comprises distributing the renormalized extracted oscillator peaks into slots of a comparator stack.

16. The method of claim 13, wherein the library of AFDVs is represented as an array of AFDVs, and wherein the comparison function is configured to compare the respective AFDV with the array of AFDVs by evaluating a matrix-vector product of the array of AFDVs and the respective AFDV.

17. The method of claim 13, wherein the library of AFDVs is stored in memory of the local device, and wherein the comparison function is a function implemented by the local device.

18. The method of claim 13, wherein the comparison function is a function implemented by a remote processor, wherein outputting the respective AFDV comprises transmitting the respective AFDV to the remote processor, and wherein the method comprises receiving the identified characteristic from the remote processor.

19. The method of claim 18, wherein the respective AFDV is transmitted to the remote processor in an encrypted form.

20. The method of claim 13, wherein at least some of the AFDVs in the library is associated with a known speech sound, and wherein the method comprises outputting the identified characteristic to a speech recognition engine configured to perform at least one of: translate spoken words into text; control automated systems through voice translation; or convert spoken words into outputs other than voice through an automated process.

21. The method of claim 20, wherein at least some of the AFDVs in the library is associated with a single word or short phrase, and wherein the speech recognition engine is configured to identify a keyword based on the identified characteristic being a single word or short phrase.

22. The method of claim 21, comprising using the identified keyword to control at least one of: the local device, an application controlled by the local device, or a remote device or system connected to the local device.

23. The method of claim 13, wherein at least some of the AFDVs in the library is associated with a known speaker, and wherein the method comprises outputting the identified characteristic to a voice identification engine configured to identify a speaker of the sample.

24. A device configured to generate advanced feature discrimination vectors (AFDVs) representing sounds forming at least part of an audio signal input to the device, the device being in the same environment as at least one source of the audio signal, wherein the device comprises at least one processor configured to:
obtain a plurality of samples of the audio signal, the plurality of samples being a portion of the audio signal as it evolves over a window of predetermined time;
for each sample of the audio signal taken:
perform a signal analysis on the sample to extract one or more high resolution oscillator peaks therefrom, the extracted oscillator peaks forming a spectral representation of the sample;
renormalize the extracted oscillator peaks to eliminate variations in the fundamental frequency and time duration for each sample occurring over the window;
normalize the power of the renormalized extracted oscillator peaks; and
form the renormalized and power normalized extracted oscillator peaks into a respective AFDV for the sample; and
output the respective AFDV to a comparison function configured to identify a characteristic of the sample based on a comparison of the respective AFDV with a library of AFDVs associated with known sounds and/or known speakers, wherein the spectral representation of the sample is associated with a single glottal pulse period, and wherein each AFDV in the library also comprises a spectral representation associated with a single glottal pulse period.

25. A device configured to generate advanced feature discrimination vectors (AFDVs) representing sounds forming at least part of an audio signal input to the device, the device being in the same environment as at least one source of the audio signal, wherein the device comprises at least one processor configured to:
obtain a plurality of samples of the audio signal, the plurality of samples being a portion of the audio signal as it evolves over a window of predetermined time;
for each sample of the audio signal taken:
perform a signal analysis on the sample to extract one or more high resolution oscillator peaks therefrom, the extracted oscillator peaks forming a spectral representation of the sample;
renormalize the extracted oscillator peaks to eliminate variations in the fundamental frequency and time duration for each sample occurring over the window;
normalize the power of the renormalized extracted oscillator peaks; and
form the renormalized and power normalized extracted oscillator peaks into a respective AFDV for the sample; and
output the respective AFDV to a comparison function configured to identify a characteristic of the sample based on a comparison of the respective AFDV with a library of AFDVs associated with known sounds and/or known speakers, wherein said renormalizing of the extracted oscillator peaks comprises representing the oscillator peaks in a common coordinate system, wherein each of the AFDVS in the library is also represented in the common coordinate system, and wherein the common coordinate system comprises a common frequency scale or a common time scale.

* * * * *

UNITED STATES PATENT AND TRADEMARK OFFICE
CERTIFICATE OF CORRECTION

| | | |
|---|---|---|
| PATENT NO. | : 11,056,097 B2 | Page 1 of 1 |
| APPLICATION NO. | : 16/520104 | |
| DATED | : July 6, 2021 | |
| INVENTOR(S) | : Short et al. | |

It is certified that error appears in the above-identified patent and that said Letters Patent is hereby corrected as shown below:

In the Specification

In Column 18, Line 18, delete "$V_{LF}^V[v_1, v_2$" and insert -- $V_{LF}^V=[v_1, v_2$, --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*